United States Patent
Schwarberg et al.

(10) Patent No.: US 12,545,002 B2
(45) Date of Patent: Feb. 10, 2026

(54) DEVICE HAVING A GUILLOTINE DEVICE FOR CUTTING TO LENGTH FOR MANUFACTURING A PACKAGING MATERIAL PRODUCT FROM A FIBRE STARTING MATERIAL AND METHOD FOR MANUFACTURNING A PACKAGING MATERIAL PRODUCT

(71) Applicant: Sprick GmbH Bielefelder Papier- und Wellpappenwerke & Co., Bielefeld (DE)

(72) Inventors: Marco Schwarberg, Melle (DE); Bastian Schalk, Detmold (DE); Vitali Krebs, Ahlen (DE)

(73) Assignee: Sprick GmbH Bielefelder Papier- und Wellpappenwerke & Co., Bielefeld (DE)

( * ) Notice: Subject to any disclaimer, the term of this patent is extended or adjusted under 35 U.S.C. 154(b) by 308 days.

(21) Appl. No.: 17/312,790

(22) PCT Filed: Dec. 11, 2019

(86) PCT No.: PCT/EP2019/084653
§ 371 (c)(1),
(2) Date: Jan. 13, 2022

(87) PCT Pub. No.: WO2020/120579
PCT Pub. Date: Jun. 18, 2020

(65) Prior Publication Data
US 2022/0242082 A1  Aug. 4, 2022

(30) Foreign Application Priority Data
Dec. 11, 2018 (DE) .................. 10 2018 009 678.6

(51) Int. Cl.
*B31D 5/00* (2017.01)

(52) U.S. Cl.
CPC .... *B31D 5/0039* (2013.01); *B31D 2205/0058* (2013.01); *B31D 2205/0094* (2013.01)

(58) Field of Classification Search
CPC ............... B31D 2205/0058; B31D 2205/0094
See application file for complete search history.

(56) References Cited

U.S. PATENT DOCUMENTS 3,613,522 A * 10/1971 Johnson ................. B65D 81/09
493/299
4,801,134 A * 1/1989 Yokoyama ........... B65H 3/5261
271/125
(Continued)

FOREIGN PATENT DOCUMENTS

| DE | 69213852 T2 | 1/1997 |
| DE | 69714026 T2 | 2/2003 |
| DE | 102012218683 A1 | 4/2014 |

OTHER PUBLICATIONS

Notification of The Submission of The International Research Report and] of The Written Notice of The International Research Authority or The Declaration dated Mar. 23, 2020, Application PCT/EP2019/084653.
(Continued)

*Primary Examiner* — Thomas M Wittenschlaeger
*Assistant Examiner* — Katie L Gerth
(74) *Attorney, Agent, or Firm* — Banner & Witcoff, Ltd.

(57) ABSTRACT

An apparatus for producing a packaging material product from a fiber starting material (e.g. single- or multi-ply paper web or corrugated board web) may include a separating device for separating the packaging material product from a packaging material strand (e.g. corrugated board web or three-dimensional paper cushioning strand), feed wheels arranged in the conveying direction upstream of the separating device for conveying the packaging material strand, and discharge wheels arranged in the conveying direction
(Continued)

Figure 1:
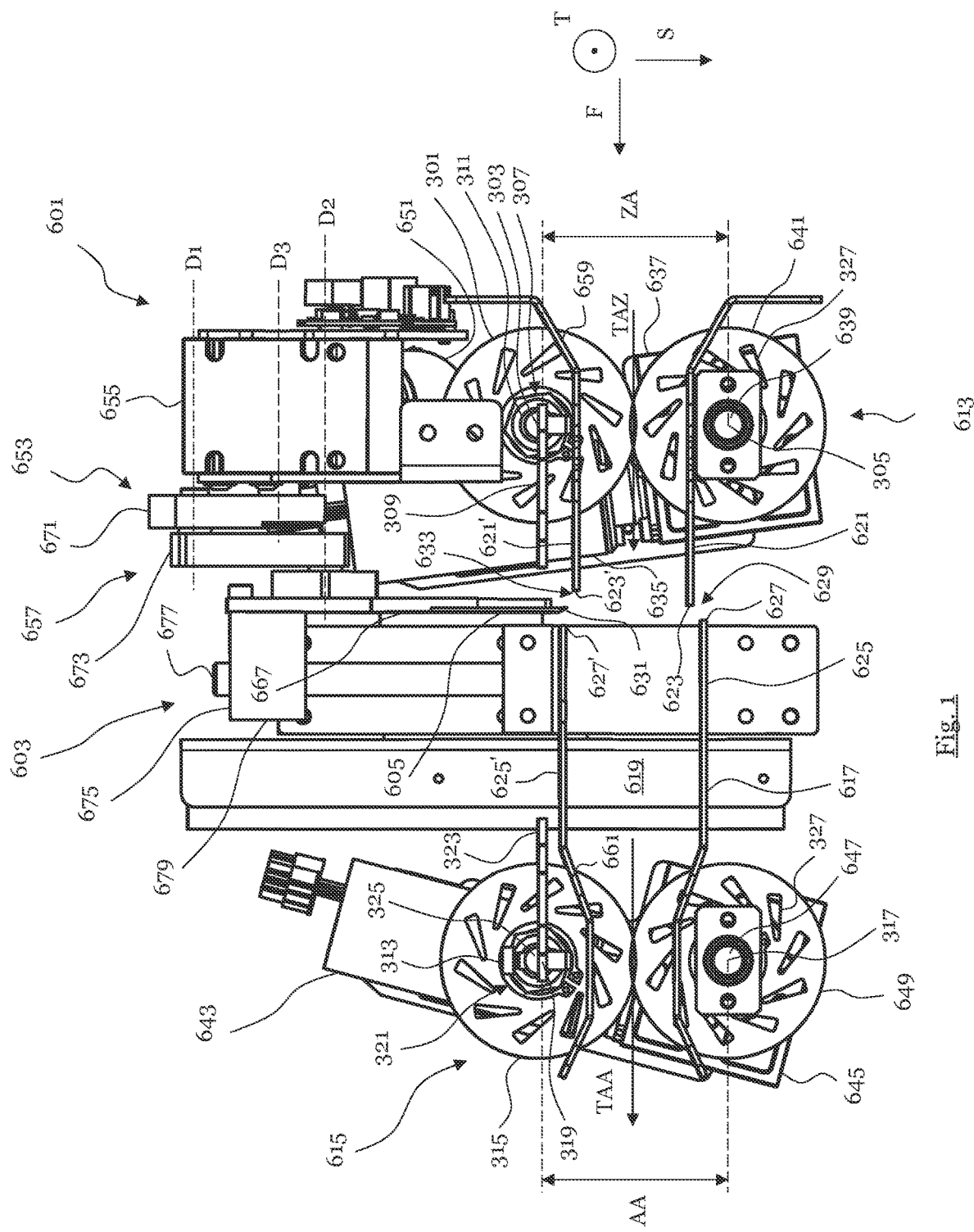

downstream of the separating device for discharging the packaging material strand. A blade of the separating device may be guided such that, in cutting engagement, it translationally cuts through the packaging material strand transversely to the conveying direction.

11 Claims, 6 Drawing Sheets

(56) References Cited

U.S. PATENT DOCUMENTS

| | | | |
|---|---|---|---|
| 5,123,889 A | 6/1992 | Armington et al. | |
| 5,327,805 A | 7/1994 | Reichental et al. | |
| 5,712,020 A * | 1/1998 | Parker | B31D 5/006 |
| | | | 428/184 |
| 5,840,004 A * | 11/1998 | Ratzel | B31D 5/0047 |
| | | | 493/464 |
| 5,906,569 A * | 5/1999 | Ratzel | B26D 1/245 |
| | | | 493/464 |
| 6,033,353 A * | 3/2000 | Lencoski | B31D 5/0047 |
| | | | 493/464 |
| 6,033,354 A | 3/2000 | Baumuller | |
| 6,168,560 B1 | 1/2001 | Pluymaekers et al. | |
| 6,311,596 B1 * | 11/2001 | Ratzel | B31D 5/0047 |
| | | | 493/372 |
| 6,468,197 B1 * | 10/2002 | Lencoski | B31D 5/0047 |
| | | | 493/464 |
| 9,884,465 B2 * | 2/2018 | Sip | B31D 5/0047 |
| 11,135,802 B2 * | 10/2021 | Schalk | B31D 5/0039 |
| 11,358,362 B2 * | 6/2022 | Cheich | B31D 5/0043 |
| 11,491,756 B2 * | 11/2022 | Christman | B31D 5/0047 |
| 11,518,135 B2 * | 12/2022 | Schalk | B65H 35/04 |
| 2002/0137617 A1 * | 9/2002 | Kobben | B26D 1/30 |
| | | | 493/350 |
| 2003/0216236 A1 * | 11/2003 | Harding | B65D 75/56 |
| | | | 493/350 |
| 2007/0021286 A1 * | 1/2007 | Kobben | B31D 5/0047 |
| | | | 493/464 |
| 2007/0117703 A1 | 5/2007 | Cavaliere et al. | |
| 2009/0082187 A1 * | 3/2009 | Cheich | B31D 5/0052 |
| | | | 53/472 |
| 2011/0295409 A1 * | 12/2011 | Mierzejewski | B65H 5/24 |
| | | | 700/295 |
| 2012/0289392 A1 * | 11/2012 | Cheich | B31D 5/0043 |
| | | | 493/464 |
| 2013/0296154 A1 * | 11/2013 | Sip | B31D 5/0047 |
| | | | 493/464 |
| 2017/0305676 A1 * | 10/2017 | Ramezani | B65G 13/06 |
| 2017/0313016 A1 * | 11/2017 | Schalk | B31D 5/0052 |
| 2022/0063228 A1 * | 3/2022 | Schwarberg | B65G 43/08 |

OTHER PUBLICATIONS

German Action dated Aug. 29, 2019, Application No. 10 2018 009 678.6.

* cited by examiner

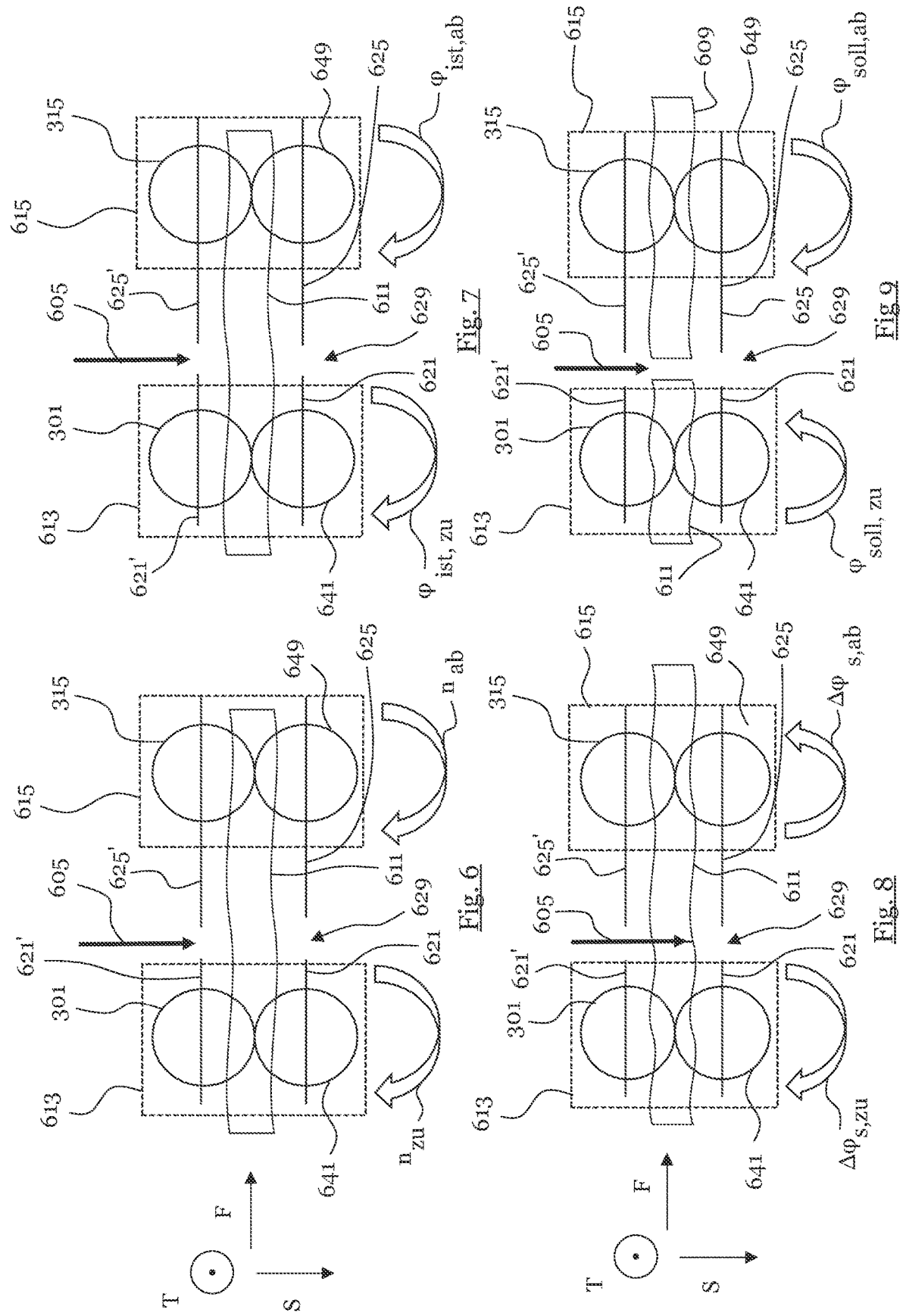

DEVICE HAVING A GUILLOTINE DEVICE FOR CUTTING TO LENGTH FOR MANUFACTURING A PACKAGING MATERIAL PRODUCT FROM A FIBRE STARTING MATERIAL AND METHOD FOR MANUFACTURNING A PACKAGING MATERIAL PRODUCT

CROSS REFERENCE TO RELATED APPLICATIONS

This patent application is a U.S. National Stage application of International Application No. PCT/EP2019/084653, filed on Dec. 11, 2019, which claims priority to German Patent Application No. 10 2018 009 678.6, filed Dec. 11, 2018, each of which is incorporated herein by reference in its entirety.

BACKGROUND

Field

The disclosure relates to an apparatus for producing a packaging material product from a fiber starting material, such as a single-ply or multi-ply paper web or a corrugated board web, in particular of recycled paper. Furthermore, the disclosure relates to methods for producing a packaging material product.

Related Art

An apparatus for producing a packaging material product is known, for example, from DE 697 35 564 T2. In this, a paper web is formed into a three-dimensional packaging material strand via a forming station and the packaging material strand is given a certain dimensional stability via a pair of deformation wheels. Subsequently, packaging material products are separated from the packaging material strand by a shear cut arrangement and are then discharged from the apparatus via a safety discharge chute. Conveyor wheels can be provided in the safety chute for conveying away the packaging material products.

A disadvantage of such apparatuses is that the shear cut arrangement is susceptible to wear, on the one hand, and causes the formation of cutting shred, on the other. Further, it has been found that the packaging material strand and the packaging material product can become trapped between the cooperating blades of the shear cut arrangement, thereby causing blockage of the apparatus. Another disadvantage is that wear of the shear cut assembly requires high rates of blade replacement to ensure reliable separation of the packaging material.

To counter these problems of known apparatuses, DE 10 2014 016 874 A1 proposes an apparatus for producing a packaging material product. The apparatus comprises a rotary cutter and a pair of conveyor wheels upstream and downstream of the rotary cutter. To increase precision when cutting off the cushioning material and to reduce wear on the rotary cutter, it is proposed to match the two pairs of conveyor wheels to each other in such a way that the cushioning material is under tension before being cut. This is achieved in particular by different conveying speeds of the two pairs of conveying wheels or by temporarily increasing the distance between the two pairs of conveying wheels. Furthermore, in particular by increasing the conveying speed of the pair of conveying wheels downstream of the rotary cutter in the conveying direction and by using a rotary cutter with a scraper device, the risk of blockages occurring in the apparatus could be reduced.

A disadvantage of the apparatus of this kind is its complexity. On the one hand, the use of a rotary cutter with a scraper device entails large manufacturing and maintenance costs. On the other hand, the known concept entails an increased development effort in the development of new apparatuses for certain paper materials and certain shapes of a packaging material product. For example, the kinematics and the forces occurring between the cutter and the scraper during stripping must already be taken into account in the design of the apparatus. Furthermore, the rotating parts of the scraper and rotary cutter provide dust-catching surfaces on the one hand and are susceptible to blockages caused by dust buildup on the other hand. The elastic scraper is also at risk of becoming porous or losing elasticity if too much dust is deposited, which can have a negative effect on the risk of blockage formation. A further disadvantage is that if, despite the proposed measures, paper blockage occurs, it can only be removed by manual intervention by an operator, which on the one hand can increase the time required for dust removal and on the other hand entails increased requirements in terms of safety regulations for the apparatus.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 a bottom view of an apparatus according to an exemplary embodiment with the lower and upper boundary walls removed to illustrate the individual components and the blade being in a cutting start position.

Figure 2:
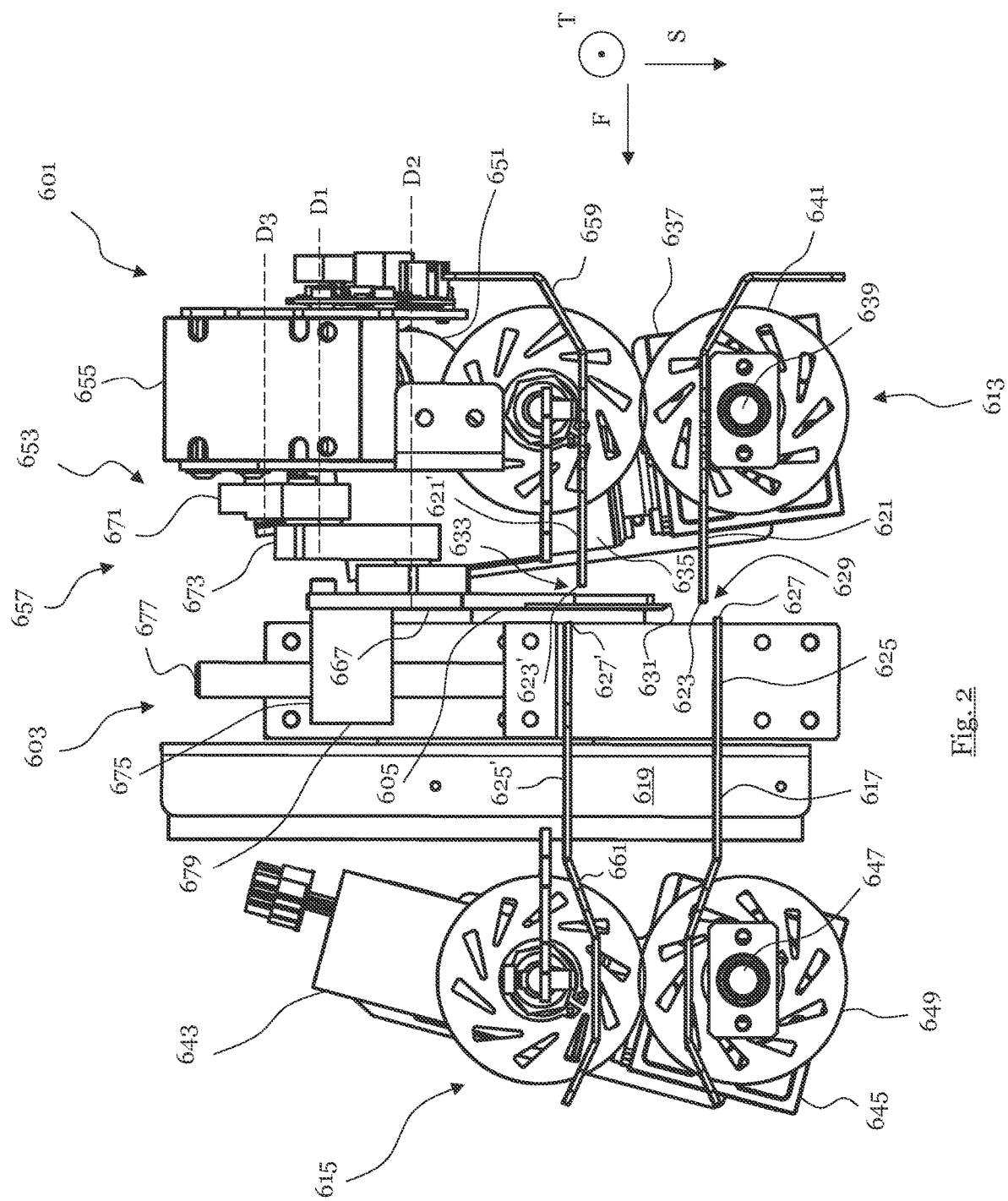

FIG. 2 a perspective top view of the apparatus of FIG. 1, with the blade being in a cutting end position.

Figure 3:
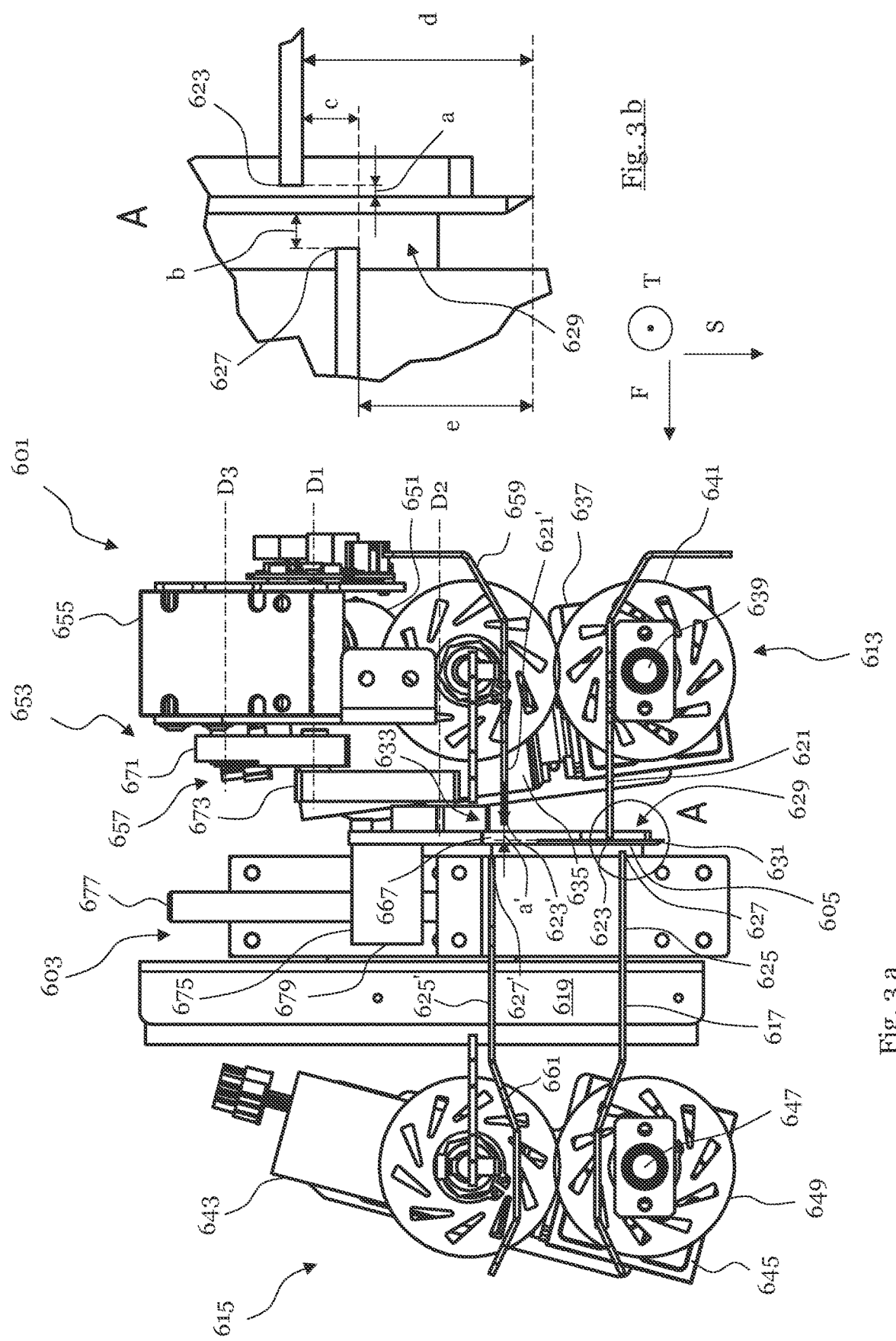

FIG. 3 a perspective bottom view of the apparatus of FIG. 1, with the blade being in the cutting end position.

Figure 4:
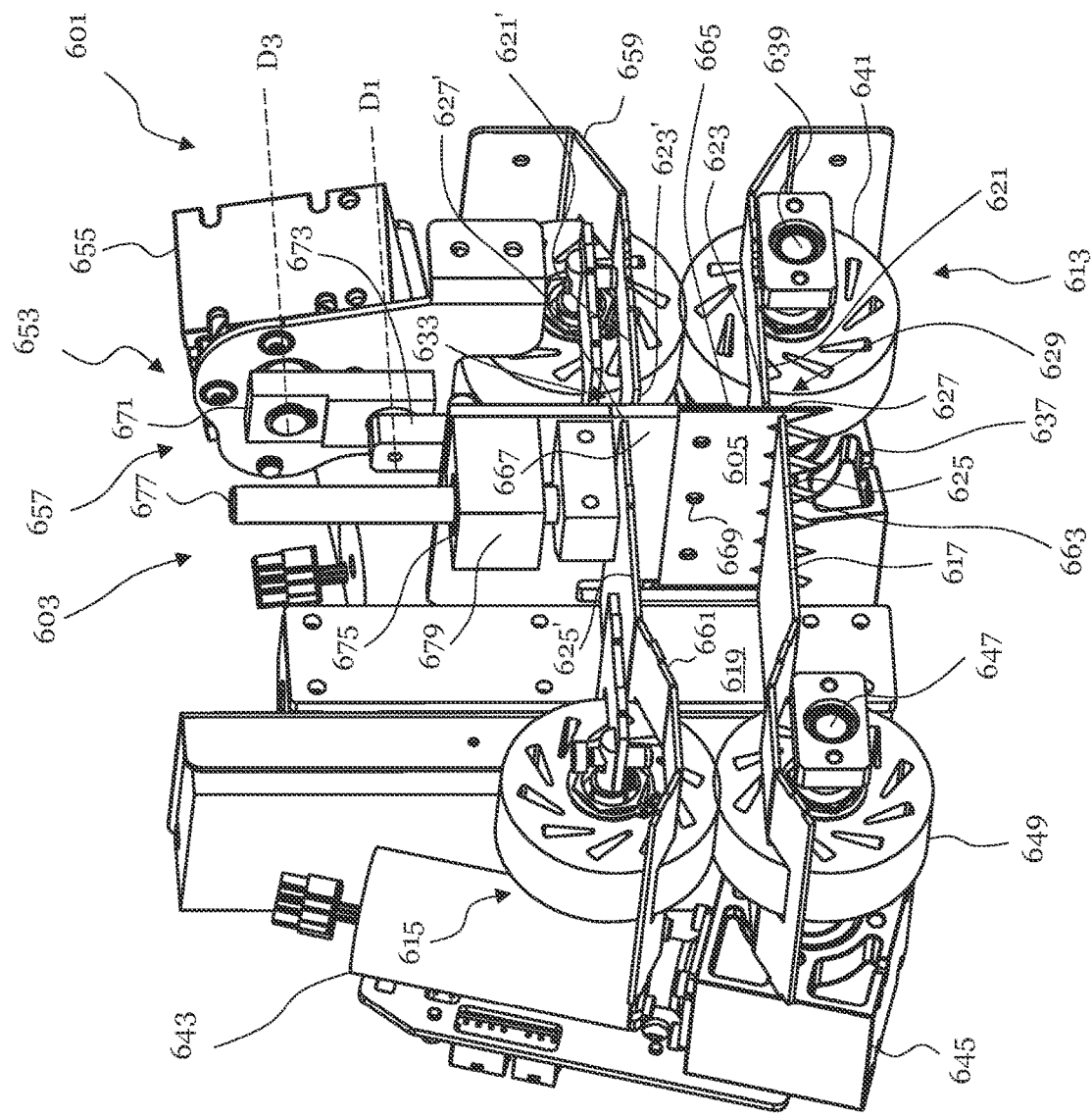

FIG. 4 a second perspective bottom view of the apparatus of FIG. 1, with the blade being in the cutting end position.

Figure 5:
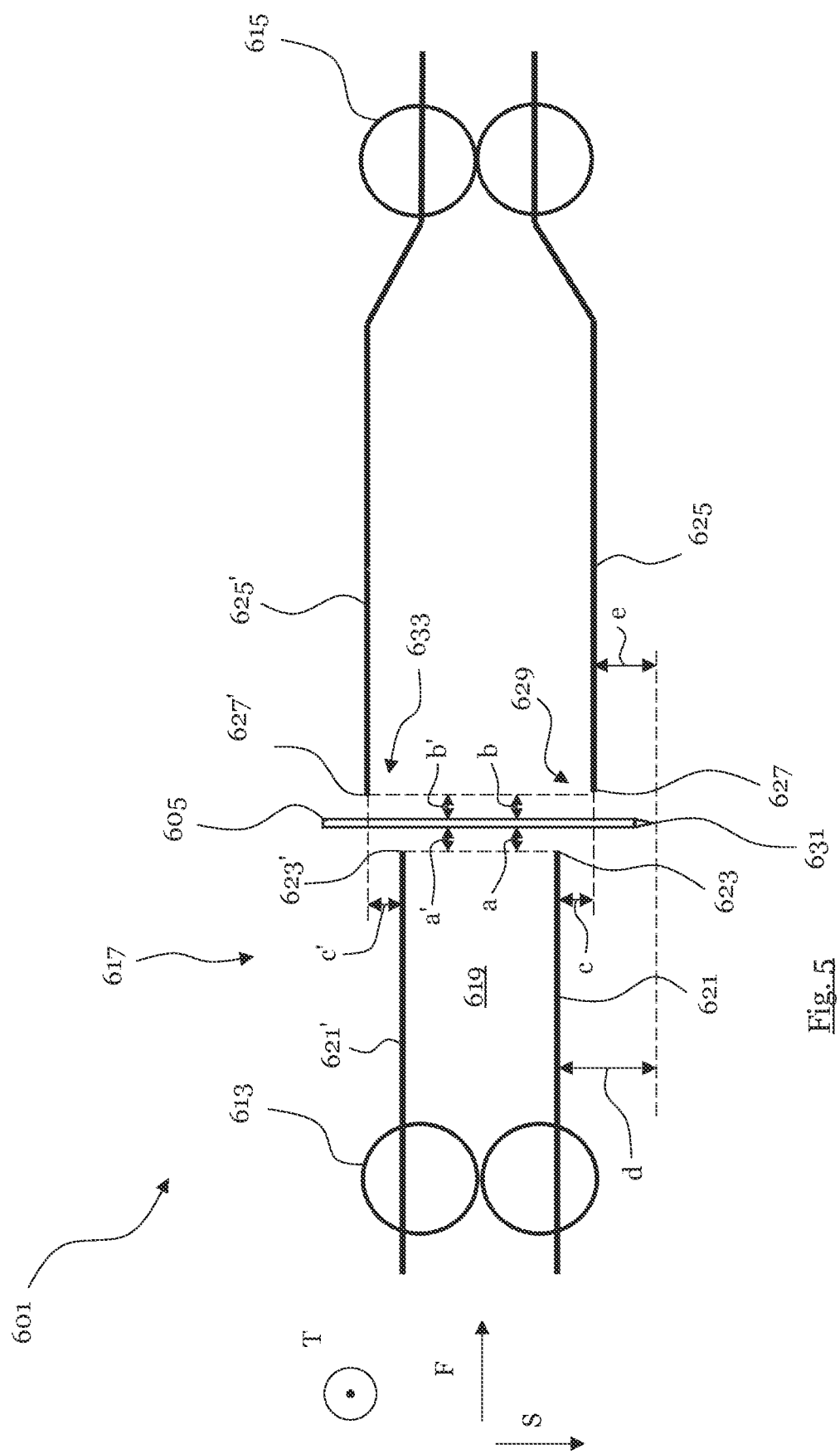

FIG. 5 a schematic representation of the connection between a higher-level controller, two lower-level sub-controllers, and two electric motors via a communication link, according to an exemplary embodiment.

FIG. 6 a schematic representation of example connections between electric motor and controller, according to an exemplary embodiment.

FIG. 7 a schematic illustration of a system according to an exemplary embodiment.

FIG. 8 a schematic illustration of a system according to an exemplary embodiment.

FIG. 9 a schematic diagram of the connection of a higher-level controller, a communication link, three electric motor-own sub-controllers, three electric motors, and a position detector and three working devices, according to an exemplary embodiment.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

It is the task of the disclosure to overcome the disadvantages of the prior art, in particular to provide an apparatus for producing a packaging material product from a fiber starting material and a method for producing a packaging material product, wherein the development, manufacturing and/or maintenance effort for the apparatus is to be reduced and the risk of blockage formation and/or dust deposition in the apparatus is not to be increased, in particular reduced, and/or blockage removal is to be made easier, in particular safer.

Apparatuses according to the present disclosure are set up, for example, in logistics centers as a movable, mobile unit in order to provide length-assembled packaging material products when packaging an object. A packaging material strand may include a paper cushioning strand obtained from a single-ply or multi-ply paper web, in particular of recycled paper, in the form of a material web roll or a zigzag-folded packaging material stack, also referred to as a fanfold stack, which saves space compared to the paper cushioning strand. To produce the paper cushioning strand, the paper web is peeled off a roll or fanfold stack and formed in such a way that air pockets are formed, which provide cushioning between the item to be packaged and the outer packaging. The packaging material product may be a paper cushioning product of a certain length which has been separated from a paper cushioning strand. A packaging material strand may also be a corrugated board web. In the case of the corrugated board web, the packaging material product may be a corrugated board web section that has been separated from the corrugated board web. Corrugated board web sections are also preferably made of recycled paper for sustainability reasons.

According to a first aspect of the present disclosure, the apparatus for producing a packaging material product from a fiber starting material, such as a single-ply or multi-ply paper web or a corrugated board web, in particular of recycled paper, comprises a separating (or cut-to-length) device for separating the packaging material product from a packaging material strand, such as a corrugated board web or a three-dimensional paper cushioning strand formed in the apparatus from the fiber starting material. Further, according to the present disclosure, a pair of feed wheels arranged upstream of the separating device for feeding the packaging material strand and a pair of discharge wheels arranged downstream of the separating device for discharging the packaging material strand are provided. According to the first aspect of the present disclosure, a blade of the separating device is guided in such a way that, in cutting engagement, it translationally cuts through the packaging material strand transversely to the conveying direction.

The packaging material product is made in particular of recycled paper. Recycled paper is in particular paper materials with a low proportion (less than 50%) of fresh fiber containing paper material. In particular, paper materials containing 70% to 100% recycled paper are preferred. The recycled paper in the sense of the present disclosure is intended to be paper material that can have a tensile strength index along the machine running direction of at most 90 Nm/g, preferably a tensile strength of 15 Nm/g to 60 Nm/g and a tensile strength index across the machine running direction of at most 60 Nm/g, preferably a tensile strength of 5 Nm/g to 40 Nm/g. A DIN EN ISO 1924-2 or DIN EN ISO 1924-3 standard can be used to determine the tensile strength or tensile strength index. In addition or alternatively, a recycled paper property or recovered paper property can be characterized by the so-called bursting resistance. A material in this sense is recycled paper with a burst index of at most 3.0 kPa*m^2/g, preferably with a burst index of 0.8 kPa*m^2/g to 2.5 kPa*m^2/g. The DIN EN ISO 2758 standard is used to determine the burst index. Furthermore, the packaging material has a surface-specific weight of, in particular, 40 g/m^2 to maximally 140 g/m^2. In particular, the fiber starting material can be a single-ply or multi-ply paper web or a corrugated board web. Furthermore, the fiber starting material can be present as a material web roll or as a zigzag-folded packaging material stack, which is also referred to as a fanfold stack.

More particularly, the apparatus described in connection with the first and/or second aspect of the present disclosure relates to a cushioning material generating apparatus. By a cushioning material generating apparatus is particularly meant an apparatus in which a three-dimensional cushioning strand, in particular a three-dimensional paper cushioning strand, is generated from a single-ply or multi-ply web of starting material, in particular from a single-ply or multi-ply paper web.

Preferably, the apparatus is an apparatus for producing a packaging material product in the form of a three-dimensional paper cushioning product. Preferably, a single-ply or multi-ply paper web is formed into a paper cushioning strand and then the paper cushioning product is separated from the paper cushioning strand via the separating device. For the formation into the paper cushioning strand, a forming device is preferably provided, which is preferably arranged upstream of the pair of feed wheels in the conveying direction. The forming device may be, for example, a funnel-shaped wall section of the device which tapers in the conveying direction towards the feed wheel pair. Alternatively or additionally, a separate forming device such as a forming funnel may be attached to the device and/or to the funnel-shaped wall portion of the device upstream of the feed wheel pair in the conveying direction. Alternatively or additionally, a forming device may be provided downstream of the separating device in the conveying direction. Such a forming device arranged downstream of the separating device may, for example, be formed by a funnel-shaped wall section of the device which tapers in the conveying direction. Preferably, a forming device arranged downstream of the separating device is arranged between the separating device and the pair of discharge wheels, in particular adjoins the pair of discharge wheels in the conveying direction.

Furthermore, the separating device preferably comprises a guide which guides the blade in such a way that it translationally cuts through the strand of material padding in the cutting engagement. The cutting engagement is to be understood in particular as the moment at which the blade enters into the material strand. Particularly preferably, the blade dips into the material strand over its entire depth in the cutting engagement. This means in particular that the blade runs straight in the depth, in particular that the tip of the blade extends in the depth at a cutting direction height. By entering with the blade over its entire depth in the cutting engagement, it can be ensured in particular that the packaging material strand is cut through as uniformly as possible, in particular simultaneously, over the entire extent of the packaging material strand in the depth direction. This reduces, and preferably prevents, tearing of the paper cushioning strand during severing.

Depth direction means in particular the direction which runs transversely, in particular orthogonally, to the cutting direction and to the conveying direction.

Tearing occurs in particular when tension is applied to the material strand before it is cut. For example, separating can be achieved simply by applying a high tension, which causes the material strand to be cut by tearing. However, tearing generates more dust than cutting with a blade, which should be avoided, particularly for safety and maintenance reasons. However, the packaging material strand can also tear to a certain extent when cut with a blade. For example, tearing occurs when the packaging material strand is put under tension before cutting and the blade, as in the case of shear cutting, enters into the material strand over one side and cuts through the material over the cutting process in the depth direction. From a certain progress of the cutting, especially in depth direction, the tension in the packaging material strand can lead to tearing of the not yet cut section. In particular, because the blade enters into the material strand in the depth direction in cutting engagement as far as possible over the entire depth of the material strand, the formation of dust can be reduced.

Due to the translational severing of the packaging material strand in the cutting engagement transverse to the conveying direction, the material strand is subjected in particular with a cutting force transverse to the conveying direction. This cutting force can preferably, in particular before the actual severing, cause the packaging material strand to be tensioned between the pairs of conveying wheels. In particular, in the embodiment in which the blade is designed and/or guided in such a way that it penetrates uniformly, in particular simultaneously, over the entire depth of the paper cushioning strand, the cutting force applied to the paper cushioning strand prior to the actual severing can be increased and thus, in particular, the tension of the packaging material strand can be increased. Compared to rotary cutters or scissor-like cooperating cutters, a translationally guided blade transverse to the conveying direction has the advantage that the applied force also acts on the packaging material strand transverse to the conveying direction, preferably orthogonal to the conveying direction, and tensions it between the pairs of conveying wheels.

In a preferred embodiment, the blade is guided in such a way that it passes through the packaging material strand in a translational manner and/or passes through it transversely to the conveying direction, preferably orthogonally to the conveying direction, and/or passes through it horizontally.

Alternatively or additionally, the blade is guided in such a way that it translationally passes through and/or horizontally passes through a conveyor channel extending at least at the conveying direction level of the separating device in the conveying direction, which channel is in particular bordered by a boundary wall, transversely to the conveying direction, preferably orthogonally to the conveying direction. The conveyor channel and preferred embodiments thereof are described in detail, in particular, in connection with the second aspect of the present disclosure.

It has been found to be particularly preferable that the blade moves purely translationally when moving from a cutting start position to a cutting end position.

Particularly preferably, the blade cuts through and/or passes through the packaging material strand and/or the conveyor channel transversely, preferably orthogonally, to the packaging material strand extending between the pairs of conveying wheels.

Furthermore, it has proved to be advantageous to design the separating device without a counter blade. In particular, this can reduce the development costs and the maintenance costs for the apparatus, since the interaction of the blade and the counter-blade generally requires the observance of close tolerances. This also increases the requirements for guiding the blade and/or the counter-blade relative to each other, so that counter-blade-free cutting can again reduce manufacturing and maintenance costs. Furthermore, the use of a counter blade can increase the wear of the blades. In addition, the close interaction between the blade and the counter-blade in particular can lead to increased occurrence of packaging material blockages. Due to the translational cutting of the packaging material strand transverse to the conveying direction, the counter blade in particular can be compensated for by tensioning the packaging material strand. Since the tensioning of the packaging material strand in particular supports the severing, the requirements on the quality of the blade in particular are reduced. Thereby, in particular, cheaper blades, for example of lower hardness, can be used, especially without reducing the service life of the blade, so that the manufacturing and maintenance costs for the apparatus are reduced.

In a preferred embodiment, the blade has several, preferably between two and ten, in particular four and eight, cutting teeth, the cutting teeth preferably being formed as triangles tapering in the cutting direction and preferably tapering in a pyramid shape, in particular in the direction opposite to the conveying direction. Alternatively or additionally, the cutting teeth adjoin one another in a direction transverse to the conveying direction and to the cutting direction, in particular orthogonally oriented, in particular in the depth direction.

As the blade inevitably wears over time, the ratio between cutting and tearing can shift towards tearing when the packaging material product is cut off, which can in particular promote dust formation. One advantage of using cutting teeth is that the pointed shape of the teeth in the cutting direction ensures penetration into the packaging material strand even with a blunted blade. In particular, this avoids the need to excessively increase the tension in the packaging material strand in order to maintain the separation, so that excessive dust formation can be avoided. The use of cutting teeth makes it possible, in particular, on the one hand to achieve immersion in the packaging material strand over the entire depth in the cutting engagement, and thus in the case of new, sharp blades in particular to achieve, as far as possible, a dust-free separating. On the other hand, compared to a smooth blade, the cutting teeth enable penetration into the paper cushioning strand and thus, as far as possible, a dust-free separating even with blunt blades.

In a preferred embodiment, the blade is driven by a rotary drive, in particular by a rotary electric motor, the rotary motion of the electric motor being converted into a translational motion by a conversion gear, such as a toggle lever.

According to a second aspect of the present disclosure, an apparatus for producing a packaging material product from a fiber starting material, such as a single-ply or multi-ply paper web or a corrugated board web, in particular of recycled paper, comprises a separating device for separating the packaging material product from a packaging material strand, such as a corrugated board web or a three-dimensional paper cushioning strand formed in the apparatus from the fiber starting material. Further, the apparatus comprises a pair of feed wheels arranged upstream of the separating device for feeding the packaging material strand and a pair of discharge wheels arranged downstream of the separating device for discharging the packaging material strand. According to the second aspect of the present disclosure, the apparatus comprises a conveyor channel extending in the conveying direction at least at the conveying direction level of the separating device, which channel is bordered by a boundary wall. In addition, according to the second aspect of the present disclosure, the device comprises a slit formed in the boundary wall, which slit is designed in such a way that a blade of the separating device can move in and out of the slit without contact. By a contact-free moving in and out of the slit it is to be understood in particular that the blade remains contact-free with respect to the counter edges bordering the slit in the conveying direction.

It should be understood that all of the embodiments mentioned in connection with the first aspect of the present disclosure may be combined with the second aspect of the present disclosure, and all of the embodiments mentioned previously and hereinafter in connection with the second aspect of the present disclosure may be combined with the first aspect of the present disclosure.

Preferably, the slit is formed at the conveying direction level of the separating device. Particularly preferably, the slit is designed in such a way that the blade can translationally cut through the packaging material strand in the cutting engagement, in particular can move purely translationally from a cutting start position into a cutting end position, and can move into and out of the slit without contact, in particular the tip of the blade can leave the conveyor channel without contact.

The slit is in particular an elongated opening. This means in particular that the extent of the slit in one longitudinal direction is significantly greater than in the other directions. The longitudinal direction of the slit corresponds in particular to the depth direction. In particular, the slit extends in depth direction by at least 200%, 300%, 400% or 500% of the slit extension in cutting direction and in conveying direction. In particular, the slit extends in depth direction by at least 60%, 80%, 90% or 95%, in particular at least 100%, of the extension of the conveyor channel, the blade, the upstream wall section and/or the downstream wall section in depth direction. In the conveying direction, the slit extends in particular between the upstream and downstream counter edges. In the cutting direction, the slit extends in particular between the boundary surface of the boundary wall facing the conveyor channel, in particular the boundary surface of the upstream wall section bordering the conveyor channel in the cutting direction, and the surface, in particular outer surface, of the boundary wall facing away from the conveyor channel, in particular the surface of the downstream wall section bordering the conveyor channel in the cutting direction. In particular, the slit extends in the cutting direction and/or in the conveying direction by a maximum of 50%, 30%, 20% or 10% of the extension of the slit in the depth direction. The blade moving into the slit particularly refers to a movement of the blade in the cutting direction beyond the boundary surface of the boundary wall facing the conveyor channel, in particular of the upstream wall section bordering the conveyor channel in the cutting direction. The blade moving out of the slit particularly refers to a movement of the blade in the cutting direction beyond the outer surface of the boundary wall facing away from the conveyor channel, in particular of the downstream wall section bordering the conveyor channel in the cutting direction. In particular, the offset of the downstream counter edge to the upstream counter edge in the cutting direction can increase the extension of the slit in the cutting direction. A movement of the blade out of the conveyor channel is achieved in particular when the blade, in particular the blade tip, moves beyond the boundary wall bordering the conveyor channel in the cutting direction, in particular the boundary surface of the upstream and/or downstream boundary wall facing the conveyor channel in the cutting direction.

The conveying direction level of the separating device means in particular the position in the conveying direction at which the blade, in particular the blade tip, of the separating device comes in cutting engagement with the packaging material strand. Preferably, the blade moves purely translationally in the cutting direction at the conveying direction level of the separating device, the cutting direction preferably running transversely, in particular orthogonally, to the conveying direction. The conveyor channel at the conveying direction level of the separating device extends in the conveying direction in particular downstream and upstream of the blade, particularly preferably at least up to the pairs of conveying wheels. Thereby, the conveyor channel is bordered in particular by the boundary wall. Preferably, the boundary wall circumferentially encloses the conveyor channel upstream and/or downstream of the separating device. This means in particular that the conveyor channel is open in the conveying direction and is bordered, in particular enclosed, by the boundary wall in the cutting direction and in the depth of the apparatus. For example, the boundary wall can have wall sections facing one another in the cutting direction and/or in the depth direction, which border the conveyor channel. However, the conveyor channel is not necessarily surrounded by the boundary wall. It can also be formed, for example, by two walls facing each other, in particular extending parallel to each other, in the cutting direction or in the depth direction, while the conveyor channel is open in the respective other direction. Particularly preferably, the conveyor channel is bordered by upper and lower wall sections facing each other, in particular extending parallel to each other, which border the conveyor channel in the depth direction. Particularly preferably, the upper and lower wall sections extend in the conveying direction between the pairs of conveyor wheels, in particular at least from the pair of feed wheels to the pair of discharge wheels. Preferably, the blade is guided over the upper and lower wall sections in the conveying direction, in particular at the level of the separating device, especially when moving from a cutting start position to a cutting end position.

In particular, the boundary wall comprises an upstream wall section. In particular, upstream of the slit in the conveying direction the conveyor channel is bordered by the upstream wall section which has an upstream counter edge bordering the slit upstream in the conveying direction. In particular, the upstream wall section borders the conveyor channel in the cutting direction. In particular, the upstream wall section extends from the slit in the direction opposite to the conveying direction and in the depth direction. In particular, the upstream wall section extends from the slit in the direction opposite to the conveying direction by at least 40%, 60%, 80% or 100% of the distance between the slit and one, in particular both, axes of rotation of the feed wheel pair in the conveying direction. In particular, the upstream wall section extends in the depth direction by at least 100%, 120%, 140%, 160% 180% or 200% of the extension of the feed wheel pair in the depth direction. In particular, the upstream wall section extends in the depth direction by at least 60%, 80%, 100%, 120%, or 140% of the extension of the packaging material strand in the depth direction. In particular, the upstream wall section extends in the depth direction and in the direction opposite to the conveying direction in such a way that it prevents the packaging material strand from leaving the conveyor channel in the cutting direction between the slit and the pair of feed wheels. In particular, the upstream wall section borders the conveyor channel in the cutting direction in such a way that entanglement of the packaging material strand with the rotational axes of the feed wheel pair is prevented. In particular, the axes of rotation of the pair of feed wheels are arranged outside the conveyor channel. In particular, the upstream wall section which borders the conveyor channel in the cutting direction extends in the depth direction and in the direction opposite to the cutting direction as uninterrupted surface. For example, the upstream wall section can extend as a continuous wall in a planar manner over at least 40%, 60%, 80% or 100% of the width of the conveyor channel in the depth direction and, starting from the slit, in the direction opposite to the conveying direction over at least 40%, 60%, 80% or 100% of the distance between the slit and the axes of rotation of the feed wheel pair.

In particular, the boundary wall comprises two upstream wall sections opposing each other in the cutting direction. In particular, a first of the two upstream wall sections is configured according to one or more of the previously described features. In particular, the second of the two upstream wall sections borders the conveyor channel in the direction opposite to the cutting direction. In particular, the second upstream wall section is designed according to one or more of the previously described features of the upstream wall section. In particular, the two upstream wall sections are spaced apart from each other in the cutting direction by at least 100%, 120% or 150% and/or by at most 400%, 300%, 250% or 200% of the extension of the packaging material strand in the cutting direction. In particular, the two upstream wall sections extend in the cutting direction between the axes of rotation of the pair of feed wheels.

In particular, the conveyor channel is bordered in the conveying direction between the axes of rotation of the pair of feed wheels and the slit by the two upstream wall sections. In particular, two upstream wall sections extend in the conveying direction and in the depth direction in such a planar manner that they prevent the packaging material strand from leaving the conveyor channel. In particular, the conveyor channel is formed by the space through which the packaging material strand passes between the pair of feed wheels and the pair of discharge wheels during production of the packaging material product. In particular, the conveyor channel extends in the cutting direction and in the depth direction over at least 100%, 120%, 140% or 160% of the extension of the packaging material strand in the cutting direction and in the depth direction. In particular, the conveyor channel extends in the cutting direction over at most the extension of the feed wheel pair, preferably over less than 100%, 90% or 80% of the extension of both feed wheels of the feed wheel pair in the cutting direction.

In a preferred embodiment, the conveyor channel is additionally bordered by two upstream upper and lower wall sections opposing each other in the depth direction. In particular, the upper and lower wall sections can provide guide surfaces for the blade. Further, the upper and lower wall sections can be used as mounting walls for attaching the pair of feed wheels. In particular, the upper and lower upstream wall sections border the conveyor channel in the depth direction. In particular, the upstream upper and lower wall sections may adjoin the upstream wall section, in particular both upstream wall sections, in the depth direction, which borders the conveyor channel in the cutting direction. In particular, the conveyor channel can be bordered by three upstream wall sections forming a U-shaped boundary wall upstream of the slit, in particular by one wall section bordering the conveyor channel in the cutting direction and two wall sections bordering the conveyor channel in the depth direction. Particularly preferably, the conveyor channel is bordered by four upstream wall sections that form, upstream of the slit, a substantially closed profile cross-section. In particular, the four upstream wall sections form an angular, in particular rectangular, upstream boundary wall upstream of the slit, which substantially surrounds the conveyor channel upstream of the slit in the cutting direction and in the depth direction. In particular, substantially is in this context to be understood in that the boundary wall surrounds the conveyor channel between the feed wheel pair and the slit in depth direction and in cutting direction to at least 70%, 80%, 90% or 95%. Particularly preferably, the upstream boundary wall surrounds the conveyor channel between the pair of feed wheels and the slit in the depth direction and in the cutting direction to 100%. Preferably, the slit, in particular in the directions orthogonal to the cutting direction, is designed in such a way that the packaging material strand and/or the packaging material product do not get jammed in the slit. To prevent this, the configurations of the slit described below have proven to be advantageous.

According to an advantageous embodiment of the present disclosure, in the conveying direction upstream of the slit the conveyor channel is bordered by an upstream wall section having an upstream counter edge bordering the slit upstream in the conveying direction.

The upstream counter edge differs from a counter blade in particular in that it has a minimum distance of at least 0.1 mm, 0.3 mm, 0.5 mm, 0.7 mm, 1.0 mm, 2 mm, 3 mm or 5 mm when the blade moves into and out of the slit. Depending on the tension under which the packaging material strand is subjected during cutting and/or the sharpness of the blade and/or the design of the conveyor channel, the counter edge preferably differs from a counter blade in that the packaging material strand is free of contact with respect to the upstream counter edge when the packaging material product is separated. Particularly in the case of blunt blades, however, the upstream counter edge can preferably also form a contact edge that assists separating. Alternatively or additionally, the distance in the conveying direction and in the direction opposite to the conveying direction between the blade and the upstream and/or the downstream counter edge is selected in such a way that cutting residues adhering to the blade are stripped off at the upstream and/or the downstream counter edge when the blade moves back into the slit, in particular into the conveyor channel. In particular, this can further reduce the accumulation of cutting residues in the conveyor channel.

An edge is to be understood in particular as a line formed by two abutting planes. In particular, an edge extends substantially in an edge direction, namely in the direction of the theoretical two-dimensional line formed by the two abutting planes. In particular, an edge may be a rounded transition surface between the two abutting planes. In particular, a counter edge means an edge or a section of an edge that remains free of contact with respect to the blade when the blade is moved into and out of the slit. The direction (edge direction) in which the upstream counter edge extends is in particular the depth direction. In particular, the upstream counter edge extends in the depth direction by at least 40%, 60%, 80%, 90% or 95%, in particular by at least 100%, of the conveyor channel. In particular, the upstream counter edge extends over the entire extension of the upstream wall section in depth direction, which borders the conveyor channel in cutting direction. In particular, the upstream counter edge is formed by a boundary surface, facing the conveyor channel, of the upstream wall section which borders the conveyor channel in the cutting direction and by the end surface, facing the slit, of the upstream wall section which borders the conveyor channel in the cutting direction. In particular, the end surface of the upstream wall section facing the slit and the boundary surface of the upstream wall section facing the conveyor channel extend in the depth direction by at least 40%, 60%, 80%, 90% or 95%, in particular by at least 100%, of the conveyor channel and/or by at least 40%, 60%, 80%, 90% or 95%, in particular by at least 100%, of the extension of the blade in the depth direction.

According to an advantageous embodiment of the present disclosure, the blade is in the conveying direction spaced from the upstream counter edge when it moves into and out of the slit. Preferably, the distance is 0.1 mm to 50 mm, 0.5 mm to 30 mm or 1.0 mm to 15 mm. Particularly preferably, the distance between the blade and the upstream counter edge in the conveying direction is constant when moving into and out of the slit, in particular over the entire travel distance from a cutting start position to a cutting end position.

Furthermore, it is preferred that the blade moves in particular in the cutting direction beyond the upstream counter edge when moving into and out of the slit. Thereby, the blade preferably moves 0.1 to 200 mm, 0.5 to 100 mm or 5.0 to 50 mm beyond the upstream counter edge.

In a further advantageous embodiment of the present disclosure, in the conveying direction downstream of the slit the conveyor channel is bordered by a downstream wall section. The downstream wall section preferably has a downstream counter edge bordering the slit downstream in the conveying direction.

In particular, the boundary wall includes a downstream wall section. In particular, the conveyor channel is bordered in the conveying direction downstream of the slit by the downstream wall portion, which has a downstream counter edge bordering the slit downstream in the conveying direction. In particular, the downstream wall section borders the conveyor channel in the cutting direction. In particular, the downstream wall section extends from the slit in the conveying direction and in the depth direction. In particular, the downstream wall section extends in the conveying direction from the slit by at least 40%, 60%, 80% or 100% of the distance in the conveying direction between the slit and one, in particular both, axes of rotation of the pair of discharge wheels. In particular, the downstream wall section extends in the depth direction by at least 100%, 120%, 140%, 160% 180% or 200% of the extension of the pair of discharge wheels in the depth direction. In particular, the downstream wall section extends in the depth direction by at least 60%, 80%, 100%, 120% or 140% of the extension of the packaging material strand in the depth direction. In particular, the downstream wall section extends in the depth direction and in the conveying direction in such a way that it prevents the packaging material strand from leaving in cutting direction the conveyor channel between the slit and the pair of discharge wheels. In particular, the downstream wall section borders the conveyor channel in the cutting direction in such a way that entanglement of the packaging material strand with the rotational axes of the pair of discharge wheels is prevented. In particular, the axes of rotation of the pair of discharge wheels are arranged outside the conveyor channel. In particular, the downstream wall section which borders the conveyor channel in the cutting direction extends in the depth direction and in the direction opposite to the cutting direction as uninterrupted surface. For example, the downstream wall section can extend as a continuous wall in the depth direction over at least 40%, 60%, 80% or 100% of the width of the feed channel and, starting from the slit, in the conveying direction, over at least 40%, 60%, 80% or 100% of the distance between the slit and the axes of rotation of the pair of feed wheels.

In particular, the boundary wall comprises two downstream wall sections opposing each other in the cutting direction. In particular, a first of the two downstream wall sections is designed according to one or more of the previously described features. In particular, the second of the two downstream wall sections borders the conveyor channel in the direction opposite to the cutting direction. In particular, the second downstream wall section is designed according to one or more of the previously described features of the downstream wall section. In particular, the two downstream wall sections are in the cutting direction spaced apart from each other by at least 100%, 120% or 150% and/or by at most 400%, 300%, 250% or 200% of the extension of the packaging material strand in the cutting direction. In particular, the two downstream wall sections extend in the cutting direction between the axes of rotation of the pair of discharge wheels.

In particular, in the conveying direction between the axes of rotation of the pair of discharge wheels and the slit the conveyor channel is bordered by the two downstream wall sections. In particular, two downstream wall sections extend in the conveying direction and in the depth direction in such a planar manner that they prevent the packaging material strand from leaving the conveyor channel. In particular, in the cutting direction the conveyor channel has maximally the same extension as the pair of discharge wheels, preferably less than 100%, 90% or 80% of the extension of both conveyor wheels of the pair of discharge wheels in the cutting direction.

In a preferred embodiment, the conveyor channel is additionally bordered by two downstream upper and lower wall sections opposing each other in the depth direction. In particular, the upper and lower wall sections can provide guide surfaces for the blade. Further, the upper and lower wall sections can be used as mounting walls for attaching the pair of discharge wheels. In particular, the upper and lower downstream wall sections border the conveyor channel in the depth direction. In particular, the downstream upper and lower wall sections may adjoin in the depth direction the downstream wall section, in particular both downstream wall sections, which borders the conveyor channel in the cutting direction.

In particular, the downstream upper and lower wall sections can merge into one another. In particular at the conveying direction level of the separating device, the downstream upper and lower wall sections can merge into the upstream upper and lower wall sections without slits. In particular, upper and lower wall sections may each extend as a continuous wall from the feed wheel pairs to the discharge wheel pair, thereby forming the upstream and downstream upper and lower wall sections. In particular, the upstream wall sections and the downstream wall sections may merge into each other without offset in the depth direction. In particular, the upstream and downstream upper and/or lower wall sections may each be formed integrally.

In particular, the conveyor channel can be bordered by three downstream wall sections which downstream of the slit form a U-shaped boundary wall, in particular by one wall section bordering the conveyor channel in the cutting direction and two wall sections bordering the conveyor channel in the depth direction. Particularly preferably, the conveyor channel is bordered by four downstream wall sections that form downstream of the slit a substantially closed profile cross-section. In particular downstream of the slit, the four downstream wall sections form an angular, in particular rectangular, downstream boundary wall, which downstream of the slit substantially surrounds the conveyor channel in the cutting direction and in the depth direction. By substantially in this context it is to be understood that the boundary wall surrounds the conveyor channel between the pair of discharge wheels and the slit in the depth direction and in the cutting direction to at least 70%, 80%, 90% or 95%. Particularly preferably, the downstream boundary wall surrounds 100% of the conveyor channel between the pair of discharge wheels and the slit in the depth direction and in the cutting direction.

Furthermore, it is advantageous that the blade is spaced in the conveying direction from the downstream counter edge when it moves into and out of the slit. Particularly preferably, the distance is 0.1 mm to 200 mm, 0.5 mm to 100 mm or 5.0 mm to 50 mm. Particularly preferably, the distance between the blade and the upstream counter edge in the conveying direction is constant when moving into and out of the slit, in particular over the entire travel distance from a cutting start position to a cutting end position.

In an advantageous embodiment, the blade moves in the cutting direction beyond the downstream counter edge when it moves into and out of the slit. Thereby, the blade preferably moves 0.1 to 150 mm, 0.5 to 70 mm or 5.0 to 30 mm beyond the downstream counter edge.

The direction (edge direction) in which the downstream counter edge extends is in particular the depth direction. In particular, the downstream counter edge extends in the depth direction by at least 40%, 60%, 80%, 90% or 95%, in particular by at least 100%, of the conveyor channel. In particular, the downstream counter edge extends in depth direction over the entire extension of the downstream wall section, which borders the conveyor channel in cutting direction. In particular, the downstream counter edge is formed by a boundary surface of the downstream wall section facing the conveyor channel and by the end surface of the downstream wall section facing the slit. In particular, the end surface of the downstream wall section facing the slit and the boundary surface of the downstream wall section facing the conveyor channel extend in the depth direction by at least 40%, 60%, 80%, 90% or 95%, in particular by at least 100%, of the conveyor channel and/or by at least 40%, 60%, 80%, 90% or 95%, in particular by at least 100%, of the extension of the blade in the depth direction.

It has been found to be advantageous that the downstream counter edge is offset from the upstream counter edge in the cutting direction. Preferably, the offset is 0.1 mm to 200 mm, 0.1 mm to 100 mm, 0.1 mm to 50 mm, 0.5 mm to 30 mm or 5 mm to 10 mm. Alternatively or additionally, the downstream counter edge and the upstream counter edge are offset from each other in such a way that the packaging material strand and/or the packaging material product remain contact-free with respect to the downstream wall section, in particular with respect to the downstream counter edge, when the packaging material product is separated.

It has been found to be particularly preferable if the blade moves out of the conveyor channel when moving into and out of the slit. Thereby, the blade preferably moves out of the conveyor channel in such a way that dust and/or shred produced during separating are ejected from the conveyor channel. Alternatively or additionally, in a cutting end position, the blade can protrude from the conveyor channel by 0.1 to 150 mm, 0.5 to 70 mm or 5.0 to 30 mm from. This means in particular that the end of the blade in the cutting direction, in particular the blade tip, protrudes from the conveyor channel by 0.1 to 150 mm, 0.5 to 70 mm or 5.0 to 30 mm. This distance is measured in particular between the end of the blade in the cutting direction, in particular the blade tip, and the boundary surface of the downstream boundary wall facing the conveyor channel, in particular the downstream counter edge. Alternatively or additionally, in a cutting end position, the blade can protrude in the cutting direction from the upstream counter edge by 0.1 mm to 200 mm, 0.5 mm to 100 mm or 5.0 mm to 50 mm.

With the previously described design of the slit, it is in particular possible to ensure that dust and shred produced during separating are mostly conveyed out of the conveyor channel and, at the same time, that cutting residues and shred adhering to the blade are stripped off on the boundary wall, in particular on at least one counter edge, when reentering the slit, in particular the conveyor channel.

In a preferred embodiment, the slit is introduced into the boundary wall in such a way, in particular the boundary wall is designed in such a way, that the blade comes into cutting engagement with the packaging material strand before entering the slit. Particularly preferably, the packaging material product is separated from the packaging material strand before the blade enters the slit. Thereby, in particular the risk of the packaging material product or the packaging material strand being trapped in the slit can be reduced. This can be in particular realized by designing the conveyor channel in the cutting direction in such a way that the packaging material strand between the pairs of conveying wheels is kept at a distance from the boundary wall, in particular from the slit. Alternatively or additionally, the packaging material strand can be tensioned prior to separation so that, under the influence of the force exerted by the blade on the packaging material strand, the packaging material strand is pressed in the cutting direction at most to just before the slit.

In a preferred embodiment of the present disclosure, the apparatus comprises a retraction slit formed in the boundary wall, which is designed in such a way that the blade can move in and out of the conveyor channel, in particular without contact. Preferably, the retraction slit is formed on a section of the boundary wall opposing the slit in the cutting direction. Particularly preferably, the retraction slit and/or the opposite section of the boundary wall is formed like the slit and/or like the wall sections environing the slit. Preferably, the blade is guided in such a way that the blade, in particular the blade tip, in a cutting start position of the blade in which the blade particularly rests before the paper cushioning product is separated, is arranged outside the conveyor channel.

Thereby, preferably the blade tip extends in the direction opposite to the cutting direction above a counter edge of the upstream section of the boundary wall which borders the retraction slit upstream. This ensures in particular that the paper cushioning strand does not get caught on the blade during conveying and discharge. When saying that the retraction slit and the sections of the boundary wall bordering the retraction slit are designed in the same way as described for the slit, it is in particular meant that the previously described distances of the blade from the upstream and downstream counter edges of the slit when moving into and out of the slit and/or the conveyor channel are preferably also maintained with respect to the retraction slit.

Particularly preferably, the retraction slit and the slit are formed in the boundary wall in such a way that, when moving from a cutting start position to a cutting end position, the blade can move into the conveyor channel via the retraction slit and, in particular, can move out of the conveyor channel via the slit on an in cutting direction opposite side of the conveyor channel. Alternatively or additionally, the retraction slit and the slit are formed in the boundary wall in such a way that the blade, when moving from a cutting start position into a cutting end position, first moves into the conveyor channel via the retraction slit, comes into cutting engagement with the packaging material strand in the conveyor channel and moves out of the conveyor channel via the slit. Furthermore, the retraction slit and the slit are alternatively or additionally formed in the boundary wall in such a way that the blade can move out of the conveyor channel via the retraction slit when moving from a cutting end position into a cutting start position.

For this purpose, the retraction slit and the slit are preferably formed opposite each other, in particular aligned with each other in the cutting direction. Particularly preferably, the slit and the retraction slit extend parallel to each other and/or form a continuous slit extending transversely to the conveying direction, in particular orthogonally to the conveying direction, and interrupt the boundary wall, in particular in the cutting direction and in the direction opposite to the cutting direction. Preferably, when moving from a cutting start position to a cutting end position, the blade moves without contact in and out of the continuous slit.

When forming the slit and/or the retraction slit, it is particularly advantageous to limit the same upstream and downstream of the blade by a respective counter edge. An advantage of the counter edges formed on both sides of the slit and/or the retraction slit is in particular that cutting residues and/or cutting shred adhering to the blade can be stripped off when reentering the slit and/or the retraction slit.

Preferably, the blade can be moved via the retraction slit completely out of the conveyor channel section adjoining the blade in the conveying direction.

In a preferred embodiment, the retraction slit extends transversely, preferably orthogonally, to the conveying direction and/or to the cutting direction.

In a preferred embodiment, the slit extends transversely, preferably orthogonally, to the conveying direction and/or to the cutting direction.

In an advantageous embodiment of the present disclosure, the pair of feed wheels, the pair of discharge wheels and the separating device are coordinated with one another in such a way that the packaging material strand is under tension, in particular when the packaging material product is separated. This can be realized, for example, by ensuring that the packaging material strand is under tension throughout during conveying between the pairs of conveying wheels. For example, this can be realized by the pair of discharge wheels imparting a greater conveying speed to the paper cushioning strand than the pair of feed wheels. However, this design can lead in particular to increased slippage and thus to increased dust formation, which is why it is not preferred.

Preferably, however, the pair of feed wheels and the pair of discharge wheels are each assigned their own drive for driving and/or braking at least one conveyor wheel of the respective pair of conveyor wheels independently of one another. Preferably, the drives are driven and/or braked independently of one another, in particular via a higher-level controller, in such a way that the pair of feed wheels and the pair of discharge wheels tension the packaging material strand before the packaging material product is separated. This can be achieved, for example, by the pair of discharge wheels driving the packaging material strand stronger than the pair of feed wheels before it is separated. The stronger driving can be, for example, a higher conveying speed, which the pair of discharge wheels apply to the packaging material strand. Alternatively or additionally, the stronger driving may be a greater conveying force applied to the packaging material strand and/or a greater rotational movement of at least one driven discharge wheel of the discharge wheel pair relative to the rotational movement of at least one driven feed wheel of the feed wheel pair. Particularly preferably, the pairs of conveyor wheels are braked, in particular stopped, before the packaging material strand is tensioned. In this way, in particular, excessive slippage and the associated formation of dust can be avoided.

The use of pairs of conveying wheels is particularly advantageous for the present disclosure because it can reduce the friction between the packaging material strand and the conveyor device, in particular reduce slippage, and thereby in particular reduce the formation of dust during the production of packaging material products.

In an advantageous embodiment of the present disclosure, the pair of feed wheels and/or the pair of discharge wheels grips the packaging material strand between two conveyor wheels and conveys the packaging material strand along or against the conveying direction. Alternatively or additionally, the pair of feed wheels and/or the pair of discharge wheels convey the strand of packaging material along or against a feed-through direction defined by a common tangent at a respective outer circumference of the feed wheels.

In a further advantageous embodiment of the present disclosure, the conveyor wheels of the feed wheel pair and/or of the discharge wheel pair are braced against each other. Preferably, the conveyor wheels of the feed wheel pair and/or of the discharge wheel pair are braced against each other with a force of at least 1 Newton, 50 Newton, 100 Newton or 150 Newton, of at least 250 Newton, 350 Newton or 450 Newton or of at least 550 Newton, 700 Newton or 900 Newton. Alternatively or additionally, the distance between the axles of the conveyor wheels of one respective wheel pair is undersized in such a way that the wheels are elastically biased against each other.

In a preferred embodiment, the wheel axles of at least one, preferably both pairs of conveyor wheels, each run parallel to each other. Alternatively or additionally, the wheel axles of at least one pair, preferably both pairs, of conveying wheels, each run transversely, preferably orthogonally, to the conveying direction or a feed-through direction defined by a common tangent at a respective outer circumference of the conveyor wheels and/or along a plane that extends transversely, preferably orthogonally, to the conveying direction or a feed-through direction defined by a common tangent at a respective outer circumference of the conveyor wheels.

In a preferred embodiment, the pairs of conveyor wheels are aligned in particular in relation to each other along a plane which has one wheel axis of a pair of conveyor wheels, preferably both wheel axes of both pairs of conveyor wheels, as a normal vector.

In a particularly preferred embodiment of the present disclosure, at least one wheel of at least one pair of conveyor wheels comprises an elastically deformable rolling area, the wheel preferably being formed by an elastomeric body, such as a PU foam body, or having a corresponding outer coating.

The present disclosure further relates to a method for producing a packaging material product from a fiber starting material, such as a single-ply or multi-ply paper web or a corrugated board web, in particular of recycled paper, wherein the method is carried out with an apparatus according to at least one of the embodiments described before or below.

A third aspect of the present disclosure relates to a packaging material, such as a paper cushioning material strand or a corrugated board web section, produced by, in particular by means of, an apparatus according to the first and/or second aspect of the present disclosure. Alternatively or additionally, the third aspect of the present disclosure relates to a packaging material produced in accordance with the method previously described.

In particular, when fiber starting material is referred to in the context of the present disclosure, a preferred embodiment or a preferred field for using the disclosure is meant. Preferably, an apparatus according to the first and/or second aspect of the present disclosure and the method described above can be used to manufacture a packaging material product from starting material in general, including fiber starting material, fiber-free starting material, such as plastic, and/or composite material, such as combinations of fiber starting material and fiber-free starting material.

In particular, the method described above may be designed to be carried out with the apparatus according to the disclosure according to the first and/or second aspect of the present disclosure.

In particular, the apparatus according to the first and/or second aspect of the present disclosure may be structured to perform the method described above.

FIG. 1 shows a view from below of a preferred embodiment of an apparatus 601 for producing packaging material products, in which a lower and upper boundary wall, in particular of the conveyor channel 619, is not shown in order to show the individual components of the apparatus 601. FIG. 1 shows the apparatus 601 with the blade 605 of a separating device 603 in a preferred cutting start position. FIG. 2 shows the apparatus of FIG. 1 with the blade 605 in an intermediate position between a preferred cutting start position and a preferred cutting end position. FIG. 3A shows the apparatus 601 of FIG. 1 with the blade 605 in a preferred cutting end position. FIG. 3B shows an enlarged view of area A of FIG. 3A. FIG. 4 shows a perspective view of FIG. 3A.

The apparatus 601 comprises a separating device 603 for separating the packaging material product (not shown in FIGS. 1 to 4) from a three-dimensional packaging material strand 611, such as a paper cushioning strand formed from a single-layer or multi-layer paper web in the apparatus 601. In the conveying direction F upstream of the separating device 603, a pair of feed wheels 613 is arranged for conveying the strand of packaging material (not shown in FIGS. 1 to 4). In the conveying direction F downstream of the separating device 603, a pair of discharge wheels 615 is arranged for discharging the strand of packaging material. The feed wheel pair 613 is driven by a drive 635, in particular in the form of an electric motor. The output of the drive 635 of the feed wheel pair 613 is coupled via a gearbox 637, in particular a worm gear, to the feed wheel pair 613, in particular to a drive shaft 639 of a feed wheel, in particular of the driven feed wheel 641.

Preferably, the conveying direction F is the direction in which the packaging material strand 611 is conveyed from the feed wheel pair 613 to the discharge wheel pair 615. In the preferred embodiment shown here, the packaging material strand 611 is conveyed directly, i.e. without deflection thereof, from the feed wheel pair 613 to the discharge wheel pair 615. It should be understood, however, that in a less preferred embodiment the packaging material strand 611 may also be deflected between the conveying wheel pairs 613, 615. In a broader sense, therefore, conveying direction F is to be understood as the direction in which the packaging material strand 611 is conveyed upstream and downstream of the conveyor device, in particular of the blade 605. For example, in the case of a plurality of deflector devices between the pairs of conveyor wheels 613, 615, the conveying direction F would be defined by the direction in which the strand of packaging material 611 is conveyed by the deflector device being located near upstream to the blade 605 and by the deflector device being located near downstream to the blade 605. In the foregoing and the following indications of locations being in the conveying direction F upstream and downstream of the separating device or respectively the blade 605, preferably the state of cutting in which the blade 605 comes into cutting engagement with the strand of packaging material 611 is to be taken into account. Thus, in the preferred embodiment in which the blade 605 moves translationally, a straight line extending along the cutting direction S can be considered as a reference for the upstream and downstream location of components. In embodiments in which the blade moves only in the cutting engagement translationally or in which the blade moves, contrary to the first aspect of the present disclosure, purely rotationally, a line extending in the cutting direction S at the time of the cutting engagement is to be considered for evaluating the upstream and downstream positioning of components with respect to the blade 605. The cutting direction S is the direction in which the blade 605 enters the packaging material strand 611 in the cutting engagement therewith. Accordingly, in the case of a purely rotationally guided blade 605, contrary to the first aspect of the present disclosure, the tangent in the cutting engagement would have to be taken into account as the cutting direction S.

The pair of discharge wheels is driven by its own drive 643, in particular an electric motor. The output of the drive 643 is coupled to the pair of discharge wheels 615, in particular to a drive shaft 647 of a driven discharge wheel 649, via a gearbox 645.

The separating device 603 is driven by a drive 651, in particular in the form of an electric motor. In FIGS. 1 to 3, the electric motor 651 of the separating device 603 extends in the drawing plane and in the cutting direction S. The output of the drive 651 of the separating device 603 is coupled to the separating device 603 via a gearbox box 653, in particular via a separating-device-own gearbox. In the embodiment shown here, the gearbox 653 of the separating device 603 comprises a transmission gear box 655 for increasing or decreasing the output movement of the drive 651. Furthermore, the separating-device-own gear box 653 comprises a conversion gear box 657 for converting a rotary movement into a translational movement, in particular in the cutting direction S.

Preferably, the blade 605 has multiple cutting teeth 663. Preferably, the blade 605 has seven cutting teeth 663. The cutting teeth adjoin one another in particular in a direction transverse to the conveying direction F, in particular orthogonal thereto, and transverse to the cutting direction S, in particular orthogonal thereto. Thereby, the cutting teeth can extend over the entire depth T of the blade 605. In the drawings, the depth T of the paper cushioning product machine is the direction pointing out of the drawing plane. The depth T preferably extends transversely, in particular orthogonally, to the cutting direction S and to the conveying direction F.

Particularly preferably, the cutting teeth 663 extend substantially over the entire depth T of the conveyor channel 619. By the entire depth T, it is not to be understood that the blade 605 drags along the not shown upper and lower boundary walls. Rather, a corresponding slit is preferably provided in the transition region between the upper and lower boundary walls and the blade so that the blade 605 travels without contact relative to the upper and lower boundary walls. Cutting teeth 663 are preferably formed as triangles tapering in the cutting direction S, which preferably taper pyramid-shaped along the thickness of the blade in the conveying direction F. The cutting teeth following in the depth T the upper and lower boundary walls merge in the direction opposite to the cutting direction S, in particular in alignment, into a mounting section 665 of the blade 605. The blade 605 is connected, in particular screwed, via the mounting section 665 to a slide 667 of the separating device 603. For fastening the blade 605 to the slide 667, bores 669 are preferably provided in the mounting section 665 of the blade 605. Via the bores 669, the blade is preferably connected to the slide 667 of the blade by means of screws or rivets. The slide moves in particular in cutting direction S.

The conversion gearbox 657 of the separating device 603 preferably comprises two joint sections 671, 673 connected to each other in a rotatable manner, in particular about an axis of rotation D1 extending in the conveying direction F. The joint sections 671, 673 are each preferably connected to each other via one end. One joint section 673 faces the slide 667 in the conveying direction. The other joint section 671 faces, in particular, the transmission gearbox 655 of the drive 651. The joint section 673 facing the slide 667 is, via its end facing away from the axis of rotation D1, articulated movably to the slide 667 via an axis of rotation D2 extending in particular in the conveying direction F. The joint section 671 facing the drive 651, in particular the transmission gearbox 655, is articulated to the transmission gearbox 655 via an axis of rotation D3 extending in particular in the conveying direction F. Furthermore, the separating device 603 preferably comprises a guide 675 in the cutting direction S. The guide preferably comprises a cylinder 677 extending in particular in the cutting direction S and a slide shoe 679 movable along the cylinder 677 in the cutting direction S. The slide shoe 679 is preferably fixedly connected to the slide 667. Particularly preferably, the guide of the blade 605 is arranged in the conveying direction downstream of the blade 605 F and the gearbox 653, in particular the conversion gearbox 657, is arranged in the conveying direction F upstream of the blade 605. In the embodiment shown, a transmission gearbox 655 is provided between the axis of rotation D3 and the drive 651 for transmitting the drive rotary motion. Preferably, the transmission gearbox 655 is a worm gear. Furthermore, the gearbox 655 can additionally be designed to offset the rotational axis of the drive 651, in particular to offset it by 90° to the rotational axis D3.

Preferably, one of the feed wheels of the pair of feed wheels is not directly driven by the drive 635. The non-directly driven feed wheel 301 is preferably driven indirectly via the driven feed wheel 641. Particularly preferably, this is achieved by the non-driven feed wheel 301 being biased against the driven feed wheel 641. As can be seen in particular in FIGS. 1 to 3*a*, the biasing is realized in particular by under sizing the distance between the wheel axles 303, 305. By under sizing the feed wheel axis distance ZA, the feed wheels are elastically biased against each other. To set the feed wheel axis distance ZA, at least one of the feed wheels 641, 301 can preferably be moved relative to the other feed wheel or braced to it. Preferably, a bracing device 307 is provided for this purpose, with which one of the feed wheels 641, 301 can be braced to the other feed wheel 301, 641 via wall sections of the apparatus 601. The bracing device preferably comprises a wheel mounting 309 connecting the feed wheel 301 to the lower and upper boundary walls, which are not shown, and at least one, preferably two, fastening means 313, such as a screw 313 (shown only for the pair of discharge wheels 615), connecting the wheel shaft 311 of the feed wheel 301 to the wheel mounting 309. As shown in FIG. 1, the bracing device 307 is preferably attached to the non-driven feed wheel 301. Thus, the feed wheel axis distance ZA can be adjusted, for example by actuating the fastening means 313, while the driven feed wheel 641 remains in a constant position relative to the drive 635. Thus, in particular the tension between the feed wheels can be adjusted, in particular depending on the fiber starting material to be processed or the desired packaging material product geometry, in particular without substantially increasing the development effort of the apparatus 601.

Alternatively or additionally, the discharge wheels 649, 315 are braced against each other. Particularly preferably, the tension between the discharge wheels 315, 649 is set via an undersized discharge wheel axis distance AA between the wheel axle 317 of the driven discharge wheel 649 and the wheel axle 319 of the not driven discharge wheel 315. The discharge wheel axis distance AA can be adjusted by a bracing device 321 as described for the pair of feed wheels 613. The bracing device 321 of the pair of discharge wheels 615 preferably also comprises a wheel mounting 323 with which the output shaft 325 of a discharge wheel 315, 649 is fixed to the apparatus 601 and a connecting means 313 for connecting the wheel shaft 325 to the wheel mounting 323 of the bracing device 321.

An undersized wheel axis distance means in particular that the distance between the wheel axles 303, 305, 317, 319 of a pair of wheel is smaller than the sum of the radii of both wheels, in particular in the dismantled state. This can be ensured in particular by a certain elasticity of the conveyor wheels. Therefore, it is preferred to form the conveyor wheels from an elastomer body, such as a PU foam body, or to provide them with an elastically deformable rolling area on their outer circumference. The elasticity of the conveyor wheels can be further increased by the measure that a plurality of recesses 327, in particular between six and fourteen, are provided, in particular recesses 327 distributed uniformly in the circumferential direction. In order to ensure that the elasticity of the conveyor wheels is substantially independent of the rotational position, the recesses 327 are preferably introduced into the conveyor wheels uniformly in the circumferential direction.

The apparatus 601 illustrated in FIGS. 1 to 4 shows the state in which no packaging material strand 611 is in engagement with the pairs of conveyor wheels 613, 615. In this state, the wheels of the pairs of conveyor wheels preferably contact each other by being mutually braced in a contact surface that is, in particular, circular or elliptical. If, on the other hand, the pairs of conveyor wheels 613, 615 are in engagement with the packaging material strand, the respective conveyor wheels are preferably separated from each other by the packaging material strand. In a less preferred embodiment, the conveyor wheels are merely in tangential contact with each other or are spaced apart from each other so that power transmission between the conveyor wheels of a pair of conveyor wheels 613, 615 does not occur until the packaging material strand 611 is in engagement with the respective pair of conveyor wheels. Preferably, the wheel axles 317, 319 of the pair of discharge wheels and/or the wheel axles 303, 305 of the pair of feed wheels are aligned with respect to each other in such a way that the tangent TAZ of the pair of feed wheels and/or the tangent TAA of the pair of discharge wheels run parallel to the conveyor direction F. In this context, a tangent is in particular not to be understood exclusively as meaning that the conveyor wheels are merely in a tangent contact with each other; rather, in the preferred embodiment in which a contact surface is created between the conveyor wheels, a line extending in the conveying direction between the first contact point and the last contact point is also to be regarded as a tangent.

In less preferred embodiments, the wheel axles 303, 305, 317, 319 of a respective pair of wheels 615, 613 can be offset from one another in such a way that the tangent TAZ of the pair of feed wheels and/or the tangent TAA of the pair of discharge wheels are inclined relative to the conveying direction F. Particularly preferably, the wheel axles of a respective pair of feed wheels are arranged relative to each other in such a way that the tangents TAZ and TAA run parallel to each other and are particularly preferably identical. This can be achieved in particular by the wheel axles 303, 305, 317, 319 of a respective pair of wheels 613, 615 being arranged one above the other, in particular in cutting direction S.

In the conveying direction F at the level of the separating device 603, a conveyor channel 619 extends which is bordered by a boundary wall 617. Preferably, the conveyor channel 619 extends in the conveying direction upstream and downstream of the separating device up to the feed wheel pair 613 and the discharge wheel pair 615, preferably beyond the conveyor wheel pairs. A slit 629 is designed in the boundary wall 617 in such a way that the blade 605 can enter and exit the slit 629 without contact.

Before the packaging material product 609 is separated from the packaging material strand 611, the packaging material strand 611 extends between the pairs of conveying wheels 613, 615. As can be seen in the comparison of FIGS. 1 to 3, the blade 605 preferably moves through the conveyor channel 619 in a purely translational manner. In particular, the blade 605 thereby travels transversely, preferably orthogonally, to the conveying direction. Preferably, the device is oriented in such a way that the blade 605 traverses the conveyor channel 619 horizontally. Traversing has in particular to be understood in that, during movement from the cutting start position to the cutting end position, the blade moves into the conveyor channel 619 from one side in cutting direction S and moves out of the conveyor channel 619 via the opposite side in cutting direction S. Moving into the conveyor channel 619 takes place in particular via a retraction slit 633, which is introduced in the boundary wall 617. Moving out of the conveyor channel 619 takes place in particular via a slit 629, which is introduced in the boundary wall 617. The designs of the slit 629 and the retraction slit 633 are described in detail in connection with the schematic representation of FIG. 5.

Preferably, the slit 629 and the retraction slit 633 are designed to be aligned with each other in the cutting direction S, so that the blade 605 can move in and out of the conveyor channel 619 translationally, in particular purely translationally. The counter edges 623, 623', 627, 627' are preferably adapted to the guide of the blade 605 in such a way that the blade 605 can move in and out of the conveyor channel 619 without contact. As can be seen in particular in FIGS. 3a and 3b, the distance a in the conveying direction F between the counter edge 623 bordering the slit 629 upstream in the conveying direction F and the blade 605 can be designed to be smaller than the distance a' in the conveying direction between the counter edge 623' bordering the retraction slit 633 upstream in the conveying direction and the blade 605. By keeping the distance a in the conveying direction F between the upstream counter edge 623 and the blade 605, when entering the slit 629, as small as possible, the function of the counter edge 623 as a contact edge supporting the separation can be increased. However, too small a design of the distance a may also increase the risk of the packaging material strand 611 being jammed into the slit 629, resulting in packaging material blockage. The aforementioned preferred dimensions of the distance a therefore represent a preferred compromise between these two effects. In contrast thereto, the counter edge 623' bordering the retraction slit 633 upstream does at least not have the same effect of supporting the separation process, so that the distance a' in the conveying direction can be designed to be greater. In particular, the counter edge 623' causes shred adhering to the blade 605 or the packaging material strand 611 to be stripped off.

As previously described, the conveyor channel 619 is bordered in the conveying direction F upstream of the slit 605 by an upstream wall section 621 and downstream of the slit 629 by a downstream wall section 625. When reference is made previously or subsequently to passing through the conveyor channel 619 in the cutting direction S, this is to be understood to mean in particular that the blade passes through the section of the conveyor channel 619 bordered by the upstream wall section 621. In particular, the blade is to be located outside the conveyor channel 619 in the cutting start position in cutting direction S, in order to avoid jamming on the blade 605, in particular on the blade tip 631, when conveying the packaging material strand 611 between the conveyor wheel pairs 613, 615.

As can be seen in particular in FIG. 3B, in particular in the cutting end position, the tip 631 of the blade 605 is intended to protrude significantly, in particular by a distance d between the blade tip 631 and the counter edge 623 bordering the slit 629 upstream. Preferably, the distance d is greater than a distance c between the counter edges 623 and 627 which border the slit 629, so that, in the end cutting position, the tip 631 of the blade 605 also protrudes beyond the counter edge 627, in particular by the distance e. Moving the blade tip 631 out of the conveyor channel 619 in particular ensures that dust and cutting shred produced by separating the packaging material product 609 from the packaging material strand 611 are discharged, in particular are ejected, from the conveyor channel 619 and/or, when reentering the conveyor channel, are stripped off at the counter edges 623, 627 so that they do not re-enter the conveyor channel 619. The previously described preferred dimensions of the distances d, e, a and b therefore represent an advantageous compromise between the advantages of dust and shred removal and support of the separation by the counter edge 623 and the risk of the formation of blockages as well as wear of the blade 605.

The distance c between the upstream counter edge 623 and the downstream counter edge 627, serves in particular to ensure that, when the packaging material product 619 is separated, the packaging material strand 611 comes into contact, if necessary, with the wall section 621 upstream in the conveying direction F but remains free of contact with respect to the wall section 625 arranged downstream in the conveying direction of the slit 629. In particular, this can reduce the risk of the packaging material strand 611 or the packaging material product 609 being drawn into the slit 629 and thereby causing a blockage. The same applies to the distance c' between the counter edges 623' and 627' defining the retraction slit 633. Overall, it is advantageous if the section of the conveyor channel 619 formed in the conveying direction F downstream of the blade 605 is widened in the cutting direction compared to the section of the conveyor channel 619 formed upstream of the blade 605.

Preferably, the boundary wall 617 has in the conveying direction F upstream of the feed wheel pair 613 and/or the discharge wheel pair 615 a funnel-shaped section 659, 661 which tapers in the conveying direction F. Preferably, the tapering occurs in the cutting direction S. Alternatively or additionally, the tapering may occur in a direction orthogonal to the conveying direction and to the cutting direction. The funnel-shaped section 659, 661 can be round or angular. In the embodiment shown here, the funnel-shaped section is angular and has a tapering in the cutting direction S only. The tapering of the conveyor channel 619 is preferably located in the region of the conveyor channel 619 where the packaging material strand 611 engages the pair of feed wheels 613 and/or the pair of discharge wheels 615. The tapering of the conveyor channel 619 can increase the degree of deformation of the essentially two-dimensional paper web into the three-dimensional packaging material strand and can facilitate the engagement with the conveyor wheel pairs 613, 615.

FIG. 5 shows a schematic representation of an apparatus 601 for producing a packaging material product 609 (not shown in FIG. 5) from a fiber starting material, in particular from a paper cushioning strand (not shown in FIG. 5) formed in the apparatus from a single-layer or multilayer paper web. The apparatus includes a blade 605 of a separating device for severing the packaging material product 609 from a packaging material strand 611. In the conveying direction F upstream of the blade 605, a pair of feed wheels 613 is arranged for conveying the packaging material strand 611. Further, in the conveying direction F downstream of the blade 605, a pair of discharge wheels 615 is arranged for discharging the strand of packaging material 611.

The position of the blade 605 shown in FIG. 5 is a schematic representation of the preferred cutting end position. Preferably, the blade 605 moves purely translationally from a cutting start position in cutting direction S to the cutting end position. Particularly preferably, the cutting direction S is transverse or orthogonal to the conveying direction F. The blade can also be guided in such a way that it traverses at least the packaging material strand 611 translationally, in particular in cutting direction S, when separating the packaging material product 609. The blade 605 can also be guided at least in such a way that, in cutting engagement, it translationally cuts through the packaging material strand 611 transversely to the conveying direction. In this case, the blade does not necessarily have to travel translationally through the entire packaging material strand 611, but can in particular also travel translationally only in the cutting engagement with the packaging material strand 611. It is preferred that the cutting direction S runs transversely, particularly preferably orthogonally, to the conveying direction F and/or runs horizontally.

The apparatus 601 has a conveyor channel 619 which is bordered by a boundary wall 617. Particularly preferably, the conveyor channel 619 extends in the conveying direction F at least between the two pairs of conveyor wheels 613, 615. In a less preferred embodiment, the conveyor channel extends at least at the conveying direction level of the separating device or the blade 605. In this case, it is particularly important to limit the conveyor channel 619 in particular immediately upstream and downstream of the blade 605. The conveyor channel 619 is limited by a boundary wall 617. In the boundary wall 617, a slit 629 is designed in such a way that the blade 605 can move in and out of the slit 627 without contact. In the conveying direction F upstream of the slit 629, the conveyor channel is bordered by a wall section 621 having an upstream counter edge 623 bordering the slit upstream in the conveying direction F. In the conveying direction downstream of the slit 629, the conveyor channel 619 is bordered by a downstream wall section 625 having a downstream counter edge 627 bordering the slit 629 downstream in the conveying direction F.

Preferably, the blade 605 is in the conveying direction F spaced from the downstream counter edge 627 and from the upstream counter edge 623 when moving into and out of the slit 629. FIG. 5 shows the particularly preferred embodiment in which the blade 605 moves purely translationally and orthogonally to the conveying direction F when moving from the cutting start position to the cutting end position, so that the distances of the counter edges 623, 627 from the blade 605 in the conveying direction F are constant. However, in less advantageous embodiments, the blade may also travel at an obtuse or acute angle transverse to the conveying direction F or may travel in a partially rotational manner. In such embodiments, the position of the blade 605 as it moves into and out of the slit is relevant for determining the distance between the blade and the counter edge. Provided that the counter edges 623 and 627 are in the cutting direction S located at the, the position of the blade when moving into and out of the slit is identical. However, if the counter edges 623, 627 are in the cutting direction S offset from each other as shown in FIG. 5, the entry into the slit 629 is defined by the position of the blade 605 in which the blade reaches, when moving from a cutting start position to a cutting end position, with the blade tip 631 the height of the first counter edge, in this case the upstream counter edge 623. Moving out of the slit 629 is determined by the position of the blade 605 at which the blade tip 631 reaches, when moving from the cutting start position to the cutting end position, the height of the second counter edge, in this case the downstream counter edge 627.

In accordance with the second aspect of the present disclosure, the blade enters the slit without contact and exits the slit 629 without contact. The distance of the upstream counter edge 623 from the blade 605 as it moves in and out of the slit is shown in FIG. 5 with reference numeral a. The distance of the downstream counter edges 627 to the blade when moving in and out of the slit 629 is drawn with the reference numeral b in FIG. 5. In FIG. 5, the preferred distance in the cutting direction between the upstream counter edge 623 and the downstream counter edge 627 is shown with reference numeral c. The distance by which the blade 605 moves beyond the upstream counter edge 623 when it enters the slit in the cutting direction S is shown with the reference numeral d in FIG. 5. The distance by which the blade 605 moves beyond the downstream counter edge 627 when moving in and out, in particular in the cutting end position, is sketched with the reference numeral e in FIG. 5.

The apparatus 601 can additionally have a retraction slit 633 formed in the boundary wall 617, which is designed in such a way that the blade can move, in particular without contact, in and out of the conveyor channel 619. The retraction slit 633 is preferably formed on a section of the boundary wall 617 opposing the slit in the cutting direction S. Particularly preferably, the retraction slit 633 and/or the section of the boundary wall 617 opposite the slit 629 is formed like the slit 629 and/or like the wall sections environing the slit. This is in particular to be understood in that the conveyor channel 619 is bordered in the conveying direction F upstream of the retraction slit 633 by an upstream wall section 621' which has an upstream counter edge 623' bordering the retraction slit 633 upstream in the conveying direction.

Alternatively or additionally, this is to be understood to mean that the conveyor channel 619 is bordered in the conveying direction F downstream of the retraction slit 633 by a downstream wall section 625' which has a downstream counter edge 627' bordering the retraction slit 633 downstream in the conveying direction F.

Preferably, when moving into and out of the slit, the blade 605 is spaced in the conveying direction F from the upstream counter edge 623' and/or from the downstream counter edge 627'.

Furthermore, this is to be understood to mean alternatively or additionally that the downstream counter edge 627' and upstream counter edge 623' are spaced from each other in the cutting direction, in particular that the downstream counter edge 627' is spaced further from the blade tip 631 in a cutting end position in the cutting direction S than the upstream counter edge 623'. The distance in the cutting direction between the upstream counter edge 623' and the downstream counter edge 627' is shown in FIG. 5 under reference character c'. The distance between the blade 605 as it enters and exits the retraction slit 633 to the upstream counter edge 623 is sketched in FIG. 5 with reference numeral a'. The distance between the downstream counter edge 627' and the blade 605 as it enters and exits the retraction slit 633 is drawn with the reference numeral b' in FIG. 5.

The previously and subsequently described embodiments of the wall sections, the counter edges and the distances between the wall sections, in particular between the counter edges and the blade, in the area of the slit 629 described above and below represent embodiments of the corresponding components in the area of the retraction slit 633 and vice versa. In the case of distances specified in cutting direction S, however, it should be ensured, as can be seen from FIG. 5, that the position of the upstream and downstream counter edges 623', 627' are respectively to be executed in the opposite direction compared to the distances of the counter edges 623, 627 in cutting direction S.

The FIGS. 6 to 9 schematically show the sequence of a preferred method for producing a packaging material product 609. In FIG. 6, the conveying of the packaging material strand between two conveyor devices in the form of pairs of conveyor wheels 613, 615 is shown. Therein, the packaging material strand 611 is fed to a separating device 603 via a pair of feed conveyor wheels 613. In FIGS. 6 to 9, a blade 605 of the separating device 603 is only indicated in the form of an arrow. As can be seen in FIG. 6, the packaging material strand 611 is conveyed in conveying direction F beyond the blade 605 of the separating device to a discharge device. The discharge device is shown here in the preferred embodiment of the previously described pair of discharge wheels 615. Preferably, the strand of packaging material 611 is conveyed in the conveying direction until it engages the pair of discharge wheels 615. When conveying the packaging material strand 611, the feed wheel pair and the discharge wheel pair are each driven at a feed speed $n_{zu}$ and a discharge speed $n_{ab}$. By driving the pair of feed wheels 613 and the pair of discharge wheels 615 independently, the speeds $n_{zu}$ and $n_{ab}$ can be set as desired in terms of their value and in terms of their relation to each another. Depending on the material of the packaging material strand, it can be advantageous to adjust the speeds $n_{zu}$ and $n_{ab}$ to each other in such a way that the packaging material strand 611 is already under tension during conveying.

The FIGS. 6 to 9 show a preferred embodiment of a method for producing packaging material products. This method relates to the production of a packaging material product 609, in which a packaging material strand 611 is fed via a feed device 613, to a separating device, the packaging material product 609 is separated from the packaging material strand 611 by the separating device 603, and the packaging material product 609 is discharged via the discharge device 615. Thereby, the feed device 613 and the discharge device 615 are driven and/or braked independently of one another before the packaging material product 609 is separated, as described in particular in connection with FIG. 7, in such a way that the packaging material strand 611 is tensioned between the feed devices 613, 615.

FIG. 7 shows a preferred embodiment of the tensioning of the packaging material strand 611, in which the feed wheel pair 613 is braked, in particular stopped, and the discharge wheel pair 615 is driven along a predetermined angle $\varphi_{ist,ab}$. Preferably, the predetermined angle $\varphi_{ist,ab}$ by which the driven discharge wheel 649 is rotated is smaller than a desired angle $\varphi_{soll,ab}$ ab by which the discharge wheel pair 615, in particular the driven discharge wheel 649, is driven. The difference between the predetermined angle $\varphi_{ist,ab}$ and the desired angle $\varphi_{soll,ab}$ arises in particular because the feed wheel pair 613 is braked, in particular stopped, in such a way that the wheels 641, 301 of the feed wheel pair at least do not completely follow the rotational movement of the wheels 649, 315 of the discharge wheel pair. As can be seen in FIG. 7, the wheels of the feed wheel pair 613 can also be rotated, in particular rotated by an angle $\varphi_{ist,zu}$, by the tension transmitted to the feed wheel pair 613 via the packaging material strand 611. However, the feed wheels 641, 301 are braked, or stopped, such that the predetermined angle $\varphi_{ist,zu}$ of the feed wheels is smaller than the predetermined angle $\varphi_{ist,ab}$ of the discharge wheels, so that a tension is created in the packaging material strand 611. The braking may be performed, for example, by a drive driving the pair of feed wheels 613 by imparting a braking torque to the pair of feed wheels 613 in the opposite direction to the conveying direction F. Alternatively or additionally, braking of the feed wheel pair 613 can also be effected by stopping the feed wheel pair 613. For example, the feed wheels 301, 641 of the feed wheel pair can be braced against each other in such a way that even if the feed wheel pair is not driven at the time of tensioning, there is resistance to a rotational movement of the feed wheels, so that the feed wheels 641, 301 do not move along the entire path that is specified by the discharge wheel pair 615.

As an alternative to the embodiment shown in FIG. 7, the tensioning of the packaging material strand 611 can, in an analogous manner, also be effected by braking, in particular stopping, the pair of discharge wheels 615 and by driving the pair of feed wheels 613 in the direction opposite to the conveying direction F. In addition, tensioning can also be performed by driving both pairs of feed wheels at different speeds, or by driving the pairs of feed wheels in different directions, in particular the pair of feed wheels in the direction opposite to the conveying direction F and the pair of discharge wheels 615 in the conveying direction F.

FIG. 8 shows the separation of the packaging material product 609 from the packaging material strand 611. A position is shown in which the blade 605 has already penetrated the packaging material strand 611, but has not yet completely separated it. As the blade penetrates the packaging material strand, the blade 605 applies a force to the packaging material strand 611 in the cutting direction S, which causes a torque on the conveyor wheels of the feed wheel pair 613 and the discharge wheel pair 615. Depending on the sharpness of the blade 605, a possible braking torque of the stopped or braked conveyor wheel pair and/or the force with which the conveyor wheel pairs are possibly braced against each other, the penetration of the blade 605 into the packaging material strand 611 can also cause a rotational movement of the feed wheel pair by a differential angle $\Delta\varphi_{S,zu}$ and/or of the discharge wheel pair 615 by a differential angle $\Delta\varphi_{S,ab}$. As can be seen by comparison through FIG. 7 and FIG. 8, the separation can thereby cause an increase in the difference between the target angles $\Delta\varphi_{S,zu}$, $\Delta\varphi_{S,ab}$ and the predetermined actual angles $\varphi_{ist,zu}$ and $\varphi_{ist,ab}$.

FIG. 9 shows a preferred state after the separation process, in which the packaging material strand 611 and the packaging material product 609 are preferably located centrally in the conveyor channel, in particular outside the slit 629. This state can be achieved in particular by the fact that the predetermined angles $\varphi_{soll,zu}$ and $\varphi_{soll,ab}$ are realized as a result of the separation of the packaging material product, thereby conveying the packaging material product 609 in the conveying direction F and/or the packaging material strand 611 in the direction opposite to the conveying direction F, in particular pulling it out of the slit 629. Thus, by coordinating the predetermined angles $\varphi_{ist,zu}$ and $\varphi_{ist,ab}$ of the feed wheel pair 613 and discharge wheel pair 615 and the target angles $\varphi_{soll,zu}$ and $\varphi_{soll,ab}$ of the conveyor wheel pairs 613, 615, a mechanism for preventing packaging material blockages, in particular one that takes place automatically, can be integrated into a process and/or into an apparatus for producing packaging material. In particular, by driving the pairs of conveyor wheels independently, this mechanism can be adjusted individually depending on the fiber starting material to be processed and the desired packaging material product to be produced by adjusting the target angles and, if necessary, the braking torques.

The features disclosed in the foregoing description, figures, and claims may be significant, both individually and in any combination, for the realization of the disclosure in the various embodiments.

REFERENCE LIST

301 Not driven feed wheel
303 Wheel axle of the not driven feed wheel
305 Wheel axle of the driven feed wheel
307 Bracing device (brace) of the feed wheel pair
309 Wheel mounting of the bracing device 307
311 Wheel shaft of not driven feed wheel 301
313 Connecting means (connector) of the clamping device
315 Not driven discharge wheel
317 Wheel axle of the driven discharge wheel
319 Wheel axle of the not driven discharge wheel
321 Bracing device of the discharge wheel pair
323 Wheel mounting of the bracing device 321
325 Wheel shaft of the not driven discharge wheel
327 Recess in conveyor wheel
601 Apparatus
603 Separating device (cutter)
605 Blade
609 Packaging material product
611 Packaging material strand
613 Pair of feed wheels
615 Pair of discharge wheels
617 Boundary wall
619 Conveyor channel
621, 621' Upstream wall section
623, 623' Upstream counter edge
625, 625' Downstream wall section
627, 627' Downstream counter edge
629 Slit
631 Blade tip
633 Retraction slit
635 Drive, electric motor of the pair of feed wheels
637 Gearbox of the pair of feed wheels
639 Drive shaft of the driven pair of feed wheels
641 Driven feed wheel
643 Drive, electric motor of the pair of discharge wheels
645 Gearbox of the pair of discharge wheels
647 Drive shaft of the driven pair of discharge wheels
649 Driven discharge wheel
651 Drive, electric motor of the separating device
653 Gearbox of the separating device
655 Transmission gearbox
657 Conversion gearbox
659 Funnel-shaped section of the pair of feed wheels
661 Funnel-shaped section of the pair of discharge wheels
663 Cutting teeth
665 Mounting section of the blade
667 Slide of the blade
669 Bores in the blade
671 Joint section (facing the transmission gearbox 655)
673 Joint section (facing the slide 667)
675 Blade guide in cutting direction
677 Guide cylinder
679 Slide shoe
T Depth of the paper cushioning product machine
F Conveying direction
S Cutting direction
AA Discharge wheel axis distance
ZA Feed wheel axis distance
TAZ Tangent of the pair of feed wheels
TAA Tangent of the pair of discharge wheels
D1 Axis of rotation between the two joint sections 671 and 673
D2 Axis of rotation between the joint section 673 and the slide 667
D3 Axis of rotation between the joint section 671 and the transmission gearbox 655
a, a' Distance in cutting direction between upstream counter edge and blade
b, b' Distance in cutting direction between downstream counter edge and blade
c, c' Distance in cutting direction between downstream counter edge and upstream counter edge
d Distance between blade tip and upstream counter edge in cutting end position of the blade
e Distance between blade tip and downstream counter edge in cutting end position of the blade.
$n_{zu}$ feed rotational speed
$n_{ab}$ discharge rotational speed $\varphi_{ist,zu}$ predetermined angle of the pair of feed wheels
$\varphi_{ist,ab}$ predetermined angle of the pair of discharge wheels
$\varphi_{soll,zu}$ Target angle of the pair of feed wheels
$\varphi_{soll,ab}$ Target angle of the pair of discharge wheels
$\Delta\varphi_{S,zu}$ Differential angle due to the cutting process at the pair of feed wheels
$\Delta\varphi_{S,ab}$ Differential angle due to the cutting process at the pair of discharge wheels
t1 Start of the production method
t2 Start of tensioning
t3 Start of separating
t4 cutting engagement

The invention claimed is:

1. An apparatus for producing a packaging material product from a fiber starting material, the apparatus comprising:
a separator including a blade and configured to separate the packaging material product from a packaging material strand, wherein the separator is free of a counter blade;
a pair of feed wheels arranged in a conveying direction upstream of the separator and configured to convey the packaging material strand, wherein the blade is configured to be guided such that the blade passes translationally and transversely to the conveying direction, through a conveyor channel which extends at least at a conveying direction level of the separator in the conveying direction, the conveyor channel being bordered by an upper boundary wall and a lower boundary wall; and
a pair of discharge wheels arranged in the conveying direction downstream of the separator and configured to discharge the packaging material strand, wherein a blade of the separator is guided such that, in cutting engagement, the blade translationally cuts through the packaging material strand transversely with respect to the conveying direction, the cutting engagement being exclusively with the packaging material strand.

2. The apparatus according to claim 1, wherein the blade has a plurality of cutting teeth formed as triangles tapering in a cutting direction opposite to the conveying direction.

3. The apparatus according to claim 1, wherein the separator is configured to drive the blade via a rotary drive, a rotary motion of the rotary drive is converted into a translational motion via a conversion gear.

4. The apparatus according to claim 1, wherein the pair of feed wheels and/or the pair of discharge wheels are configured to grip the packaging material strand between two conveyor wheels of the feed wheels and/or discharge wheels and convey the packaging material strand along or against the conveying direction and/or along or against a feed-through direction defined by a common tangent at a respective outer circumference of the two conveyor wheels.

5. The apparatus according to claim 1, wherein:
wheels of the pair of feed wheels and/or the pair of discharge wheels are configured to be braced against each other, and/or
a wheel axis distance of the wheels relative to one another of a respective pair of feed wheels and/or discharge wheels is undersized such that the wheels are elastically biased against one another.

6. The apparatus according to claim 1, wherein wheel axes of at least one of the pairs of feed wheels and discharge wheels extend:
parallel to one another;
extend transversely to the conveying direction or a feed-through direction defined by a common tangent at a respective outer circumference of the feed wheels and discharge wheels; and/or
extend along a plane extending transversely to the conveyor direction or the feed-through direction defined by the common tangent at the respective outer circumference of the feed wheels and discharge wheels.

7. The apparatus according to claim 1, wherein the pairs of feed wheels and discharge wheels are oriented in alignment to one another along a plane which includes wheel axes of both pairs of feed wheels and discharge wheels, as a normal vector.

8. The apparatus according to claim 1, wherein at least one wheel of at least one pair of the feed wheels and discharge wheels comprises an elastically deformable rolling area, the at least one wheel being formed by an elastomer body or has a corresponding outer coating.

9. The apparatus according to claim 1, wherein the cutting engagement is exclusively within the conveyor channel extending between the pair of feed wheels and the pair of discharge wheels in the conveying direction.

10. The apparatus according to claim 1, wherein the blade translationally cuts through the packaging material strand exclusively within the conveyor channel such that the packaging material product is separated from the packaging material strand exclusively within the conveyor channel.

11. A method of producing a packaging material product from a fiber starting material, the method comprising:
separating, using a separator having a blade and being free of a counter blade, the packaging material product from a packaging material strand, the separating including guiding the blade of the separator such that, in cutting engagement, the blade translationally cuts through the packaging material strand transversely with respect to a conveying direction, wherein the cutting engagement is exclusively with the packaging material strand and the blade is guided such that the blade passes translationally and transversely to the conveying direction, through a conveyor channel which extends at least at a conveying direction level of the separator in the conveying direction, the conveyor channel being bordered by an upper boundary wall and a lower boundary wall;
convey the packaging material strand using a pair of feed wheels arranged in the conveying direction upstream of the separator; and
discharging the packaging material strand using a pair of discharge wheels arranged in the conveying direction downstream of the separator.

* * * * *